(12) United States Patent
Murayama et al.

(10) Patent No.: US 10,464,632 B2
(45) Date of Patent: Nov. 5, 2019

(54) STRADDLED VEHICLE

(71) Applicant: YAMAHA HATSUDOKI KABUSHIKI KAISHA, Iwata-shi, Shizuoka-ken (JP)

(72) Inventors: Masashi Murayama, Shizuoka (JP); Takashi Ono, Shizuoka (JP); Hiroyuki Okochi, Shizuoka (JP)

(73) Assignee: YAMAHA HATSUDOKI KABUSHIKI KAISHA, Iwata-Shi, Shizuoka-Ken (JP)

( * ) Notice: Subject to any disclaimer, the term of this patent is extended or adjusted under 35 U.S.C. 154(b) by 182 days.

(21) Appl. No.: 15/843,852

(22) Filed: Dec. 15, 2017

(65) Prior Publication Data

US 2018/0346063 A1 Dec. 6, 2018

(30) Foreign Application Priority Data

Jun. 2, 2017 (JP) .................................. 2017-110488

(51) Int. Cl.
| | |
|---|---|
| B62M 7/02 | (2006.01) |
| B62K 25/28 | (2006.01) |
| B62K 11/04 | (2006.01) |
| B62K 19/30 | (2006.01) |

(52) U.S. Cl.
CPC .............. *B62M 7/02* (2013.01); *B62K 11/04* (2013.01); *B62K 19/30* (2013.01); *B62K 25/283* (2013.01); *B62K 2201/02* (2013.01)

(58) Field of Classification Search
None
See application file for complete search history.

(56) References Cited

U.S. PATENT DOCUMENTS

| | | | | |
|---|---|---|---|---|
| 4,487,285 A | * | 12/1984 | Tomita | B62M 7/02 180/228 |
| 6,213,240 B1 | * | 4/2001 | Buell | B62K 11/04 180/228 |
| 6,547,207 B1 | * | 4/2003 | Thompson | F16F 1/38 248/609 |
| 6,588,530 B2 | * | 7/2003 | Keller | B62K 11/04 180/228 |

(Continued)

FOREIGN PATENT DOCUMENTS

JP  H06-016171 A  1/1994

*Primary Examiner* — Kevin Hurley
*Assistant Examiner* — Harold Eric Pahlck, III
(74) *Attorney, Agent, or Firm* — Rabin & Berdo, P.C.

(57) ABSTRACT

A swing arm extends rearwardly from an engine, and a pair of side cases is arranged leftwardly and rightwardly of the swing arm. The swing arm is supported at a body frame by a single rear shock absorber. The engine is supported at the body frame by a plurality of vibration absorbing support members. Each vibration absorbing support member has a structure in which a rubber member is arranged between an outer cylinder and an inner cylinder. The engine is attached to the inner cylinder with use of an engine support shaft, and the body frame is attached to the outer cylinder with use of an engine bracket. The rubber member has projections being in contact with an inner surface of the outer cylinder and recesses not being in contact with the inner surface of the outer cylinder. The swing arm is rigidly and pivotally connected to the engine.

10 Claims, 15 Drawing Sheets

(56) References Cited

U.S. PATENT DOCUMENTS

| | | | | |
|---|---|---|---|---|
| 6,902,023 B2* | 6/2005 | Brendelson | ............ | B62K 11/04 |
| | | | | 180/219 |
| 7,913,793 B2* | 3/2011 | Kofuji | .................... | B62K 19/30 |
| | | | | 180/226 |
| 9,394,028 B2* | 7/2016 | Woltz | ...................... | B62K 25/28 |
| 10,059,183 B2* | 8/2018 | Wada | ........................ | B62M 7/02 |
| 2018/0328433 A1* | 11/2018 | Nishi | .................... | F16F 1/3835 |

\* cited by examiner

CROSS SECTIONAL VIEW TAKEN ALONG LINE A-A

CROSS SECTIONAL VIEW TAKEN ALONG LINE B-B

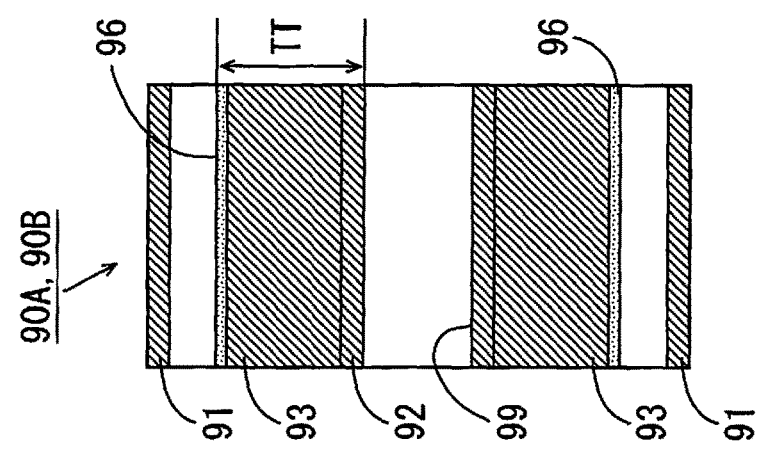
FIG. 7C CROSS SECTIONAL VIEW TAKEN ALONG LINE D-D
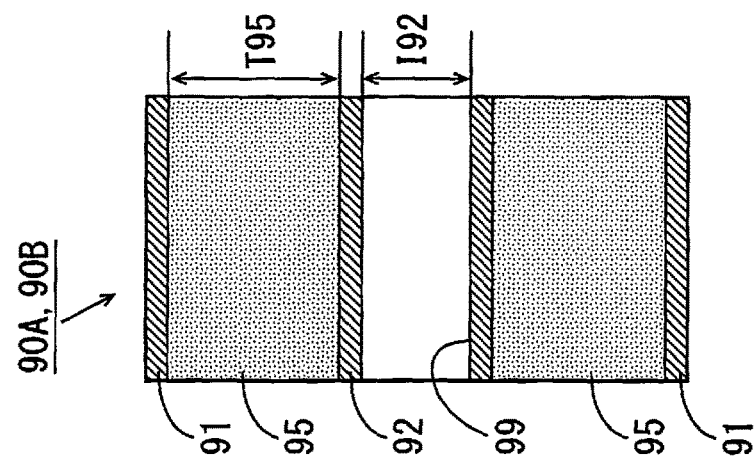
FIG. 7B CROSS SECTIONAL VIEW TAKEN ALONG LINE C-C
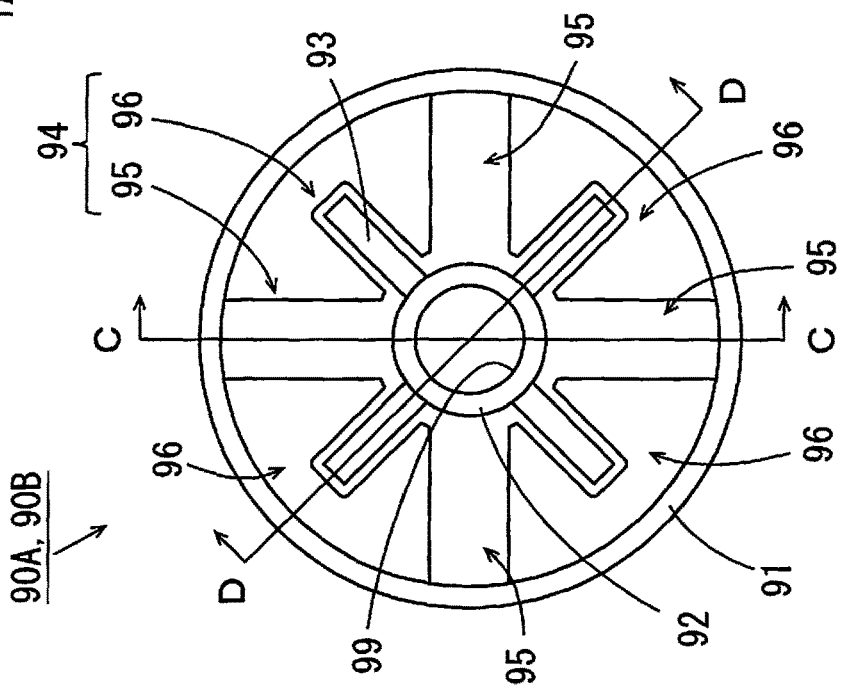
FIG. 7A

STRADDLED VEHICLE

BACKGROUND OF THE INVENTION

Field of the Invention

The present invention relates to a straddled vehicle including an engine and a swing arm.

Description of Related Art

In a motorcycle described in JP 6-16171 A, a V-type engine is arranged in a space surrounded by a down tube and a main frame. The engine is supported at one portion of the down tube and two portions of the main frame with the use of three cylindrical vibration isolating rubber parts. A rear arm (swing arm) is rotatably supported at a rear portion of the main frame. A rear wheel is rotatably attached to a rear end of the rear arm. Further, a rear shock absorber is attached to a position in the vicinity of the rear end of the rear arm. A driving sprocket is attached to a shaft connected to a gear in a gear box of the engine. A chain is looped over the driving sprocket and a driven sprocket of the rear wheel.

In the motorcycle described in JP 6-16171 A, vibration transmitted from the engine to a vehicle body is reduced by the three vibration isolating rubber parts. In order to ensure good drivability, it is required that vibration transmitted from the engine is further reduced.

SUMMARY

An object of the present invention is to provide a straddled vehicle in which vibration transmitted from an engine to a rider can be reduced.

In order to further reduce the vibration transmitted from the engine to the vehicle body, it is considered that the thickness of the cylindrical vibration isolating rubber is increased such that the vibration of the engine is sufficiently absorbed.

First, the inventors of the present invention increased the thickness of the cylindrical vibration isolating rubber in order for the vibration transmitted from the engine to be further reduced. As a result, an amount of shape change of the cylindrical vibration isolating rubber increases due to an increase in thickness of the cylindrical vibration isolating rubber. Therefore, an amount of change of relative positions between the body frame and the engine in a vehicle front-and-rear direction, in particular, increases. That is, a distance between the driving sprocket and the driven sprocket changes significantly as compared to the case where the conventional cylindrical vibration isolating rubber is used. Thus, tooth jumping is likely to occur between a motive power transmitting member such as a chain or a belt and the driving sprocket, or between the motive power transmitting member and the driven sprocket. The tooth jumping refers to the case where a portion, engaging with one gear of a sprocket, of a motive power transmitting member temporarily disengages from the gear, and then engages with another gear. In this case, reliability of a driving system is degraded.

As such, the inventors of the present invention considered to rigidly connect the engine to the swing arm. Thus, the distance between the driving sprocket and the driven sprocket can be maintained constant. However, in a configuration in which the engine is rigidly connected to the swing arm, an amount of change of relative positions of the drive wheel, the swing arm and the engine with respect to the body frame is likely to increase depending on a travelling condition. In particular, when the thickness of the cylindrical vibration isolating rubber increases, an amount of change of relative positions of the drive wheel, the swing arm and the engine with respect to the body frame is more likely to increase. Thus, drivability is degraded.

Further, in a configuration in which a pair of side cases is arranged at the left and right of the swing arm, it is desired that capacity of the side cases is ensured to be as large as possible by arrangement of the single rear shock absorber between a right end and a left end of the swing arm. However, as compared to the case where the swing arm is supported by a pair of rear shock absorbers, and relative positions of the drive wheel, the swing arm and the engine with respect to the body frame are restricted, it is difficult to restrict the change of the relative positions by the single rear shock absorber. In particular, when the thickness of the cylindrical vibration isolating rubber is large, it is more difficult to restrict the change of the relative positions of the drive wheel, the swing arm and the engine with respect to the body frame. Thus, drivability is degraded.

As such, the inventors of the present invention repeated trials and consideration in order to ensure good drivability by reducing vibration transmitted from the engine to the rider. As a result, the inventors of the present invention have discovered that, if a damper function is present only for the vibration of the engine in a top-and-bottom direction, comfort of a driver is not impaired. Further, the inventors of the present invention have discovered that drivability is improved when swinging of the engine in another direction is restricted. The invention on the basis of these findings is as described below.

(1) A straddled vehicle according to one aspect of the present invention includes a body frame, a plurality of vibration absorbing support members that support an engine at the body frame, a drive wheel rotated by the engine, a swing arm that extends rearwardly from the engine in a vehicle front-and-rear direction and rotatably supports the drive wheel at a position further rearward than the engine in the vehicle front-and-rear direction, a pair of side cases arranged leftwardly and rightwardly of the swing arm in a plan view of the vehicle, a single rear shock absorber that supports the swing arm at the body frame, a pitching restricting member that connects the engine to the body frame such that vibration of the engine in a top-and-bottom direction with respect to the body frame is allowed, and connects the engine to the body frame such that pitching of the engine with respect to the body frame is restricted, a yawing restricting member that connects the engine to the body frame such that vibration of the engine in the top-and-bottom direction with respect to the body frame is allowed, and connects the engine to the body frame such that yawing of the engine with respect to the body frame is restricted, and a rolling restricting member that connects the engine to the body frame such that vibration of the engine in the top-and-bottom direction with respect to the body frame is allowed, and connects the engine to the body frame such that rolling of the engine with respect to the body frame is restricted. In the plan view of the vehicle, the rear shock absorber is arranged between the engine and the drive wheel and between a right end and a left end of the swing arm. The swing arm is rigidly and pivotally connected to the engine, and each of the plurality of vibration absorbing support members includes an outer cylinder, an inner cylinder arranged in the outer cylinder and a rubber member provided between the outer cylinder and the inner cylinder. The engine is attached to the inner cylinder, and the body frame is attached to the outer cylinder. The rubber member has a first portion being in contact with an inner surface of the outer cylinder, and a second portion not being in contact with the inner surface of the outer cylinder, and a maximum thickness of the rubber member in a radial direction of the outer cylinder and the inner cylinder is equal to or larger than ½ of an inner diameter of the inner cylinder.

In this straddled vehicle, the swing arm extends rearwardly from the engine in the vehicle front-and-rear direction, and the pair of side cases is arranged leftwardly and rightwardly of the swing arm in the plan view of the vehicle. The swing arm is supported at the body frame by the single rear shock absorber. The drive wheel is supported by the swing arm at a position further rearward than the engine. The single rear shock absorber is arranged between the engine and the drive wheel and between the right end and the left end of the swing arm. Thus, in a configuration in which the pair of side cases is provided, it is not necessary to respectively provide the pair of rear shock absorbers between the drive wheel and the pair of respective side cases. Therefore, capacity of the side cases can be ensured, and the size of the straddled vehicle in the vehicle width direction is inhibited from increasing.

The engine is supported at the body frame by the plurality of vibration absorbing support members. Each vibration absorbing support member has a structure in which the rubber member is arranged between the outer cylinder and the inner cylinder. The engine is attached to the inner cylinder, and the body frame is attached to the outer cylinder. The rubber member has the first portion being in contact with the inner surface of the outer cylinder and the second portion not being in contact with the inner surface of the outer cylinder. Further, the maximum thickness of the rubber member in the radial direction of the outer cylinder and the inner cylinder is equal to or larger than ½ of the inner diameter of the inner cylinder. Thus, each vibration absorbing support member has high vibration absorbing capacity.

The swing arm is rigidly and pivotally connected to the engine. Therefore, a distance between a driving sprocket rotated by the motive power of the engine and a driven sprocket rotatably provided at the swing arm does not change. On the other hand, the engine swings due to vibration and the like generated in the drive wheel and the swing arm due to a condition of a road surface.

The engine and the body frame are connected to each other by the pitching restricting member. Thus, pitching of the engine with respect to the body frame is restricted. Further, the engine and the body frame are connected to each other by the yawing restricting member. Thus, yawing of the engine with respect to the body frame is restricted. Further, the engine and the body frame are connected to each other by the rolling restricting member. Thus, rolling of the engine with respect to the body frame is restricted. The pitching restricting member, yawing restricting member and the rolling restricting member are provided to allow vibration of the engine in the top-and-bottom direction. Therefore, a direction in which the engine swings is limited to the top-and-bottom direction.

In this case, vibration of the engine is absorbed by the plurality of vibration absorbing support members while swinging of the engine in the top-and-bottom direction is allowed. Thus, vibration transmitted from the engine to the body frame is reduced.

As a result, vibration transmitted from the engine to the rider is reduced, and good drivability can be ensured.

(2) The first portion of the rubber member may include a plurality of projections that project from the inner cylinder towards the outer cylinder, the second portion may include a plurality of recesses, and each one of the plurality of recesses may be arranged between two adjacent projections of the plurality of projections.

In this case, the rubber member can equally extend and contract.

(3) Each of the plurality of vibration absorbing support members may include a plurality of extension contraction amount restricting members provided at the plurality of recesses of the rubber member, and the plurality of extension contraction amount restricting members may restrict an amount of extension and contraction of the rubber member within a constant range.

In this case, swinging of the engine is restricted within the constant range.

(4) The straddled vehicle may further include a shaft member that extends in a vehicle width direction, wherein the plurality of vibration absorbing support members may include a first vibration absorbing support member. The shaft member may be inserted into the inner cylinder of the first vibration absorbing support member, and the engine and the swing arm may be attached to the shaft member.

In this case, the swing arm is rigidly and pivotally connected to the engine with use of the shaft member, and the engine is attached to the inner cylinder of the first vibration absorbing support member with use of the shaft member. Thus, the number of components is reduced.

(5) The plurality of vibration absorbing support members may include a second vibration absorbing support member that supports the engine at the body frame at a position further forward than the first vibration absorbing support member in the vehicle front-and-rear direction.

In this case, the engine can be stably supported at the body frame by the small number of vibration absorbing support members.

(6) A maximum thickness of the rubber member in a radial direction of the outer cylinder and the inner cylinder of the second vibration absorbing support member may be equal to or larger than an inner diameter of the inner cylinder.

In this case, vibration of the engine is sufficiently absorbed by the second vibration absorbing support member.

(7) The pitching restricting member may include first and second pitching restricting members that extend in the vehicle front-and-rear direction in the plan view of the vehicle and are arranged at upper and lower positions. The first pitching restricting member may be attached to the engine to be swingable about a first shaft in parallel with a vehicle width direction, and may be attached to the body frame to be swingable about a second shaft in parallel with the vehicle width direction. The second pitching restricting member may be attached to the engine to be swingable about a third shaft in parallel with the vehicle width direction, and may be attached to the body frame to be swingable about a fourth shaft in parallel with the vehicle width direction.

In this case, the engine is connected to the body frame by the upper first pitching restricting member and the lower second pitching restricting member, whereby pitching of the engine with respect to the body frame is restricted. The engine is supported at the body frame against a counterforce from the rear shock absorber. Further, forward-rearward movement of the engine is restricted. On the other hand, the first and second pitching restricting members swing, so that the engine can move in the top-and-bottom direction with respect to the body frame.

(8) The yawing restricting member may include first and second yawing restricting members that extend in the vehicle front-and-rear direction and are respectively arranged leftwardly and rightwardly of the body frame in the plan view of the vehicle. The first yawing restricting member may be attached to the engine to be swingable about a fifth shaft in parallel with a vehicle width direction, and may be attached to the body frame to be swingable about a sixth shaft in parallel with the vehicle width direction. The second yawing restricting member may be attached to the engine to be swingable about a seventh shaft in parallel with the vehicle width direction, and may be attached to the body frame to be swingable about an eighth shaft in parallel with the vehicle width direction.

In this case, the engine is connected to the body frame by the left first yawing restricting member and the right second yawing restricting member, whereby yawing of the engine with respect to the body frame is restricted. Thus, the swing arm rigidly connected to the engine is prevented from swinging to the left and right. On the other hand, the first and second yawing restricting members swing, whereby the engine can move in the top-and-bottom direction with respect to the body frame.

(9) The rolling restricting member, in the plan view of the vehicle, may be arranged to extend in a vehicle width direction, may be attached to the engine to be rotatable about a ninth shaft in parallel with the vehicle front-and-rear direction, and may be attached to the body frame to be rotatable about a tenth shaft in parallel with the vehicle front-and-rear direction.

In this case, the engine is connected to the body frame by the rolling restricting member extending in the vehicle width direction, whereby rolling of the engine with respect to the body frame is restricted. On the other hand, the rolling restricting member swings, so that the engine can move in the top-and-bottom direction with respect to the body frame.

(10) The rolling restricting member may be arranged at a position further forward than the pitching restricting member and the yawing restricting member in the vehicle front-and-rear direction.

In this case, stability of the support for the engine with respect to the body frame is improved.

Other features, elements, characteristics, and advantages of the present invention will become more apparent from the following description of preferred embodiments of the present invention with reference to the attached drawings.

BRIEF DESCRIPTION OF THE DRAWINGS

FIGS. 7A to 7C are diagrams for explaining a configuration of vibration absorbing support members of FIGS. 5 and 6;

DETAILED DESCRIPTION

A straddled vehicle according to embodiments of the present invention will be described below with reference to drawings. In the following description, a motorcycle is described as one example of the straddled vehicle.

(1) Schematic Configuration of Motorcycle

Figure 1:
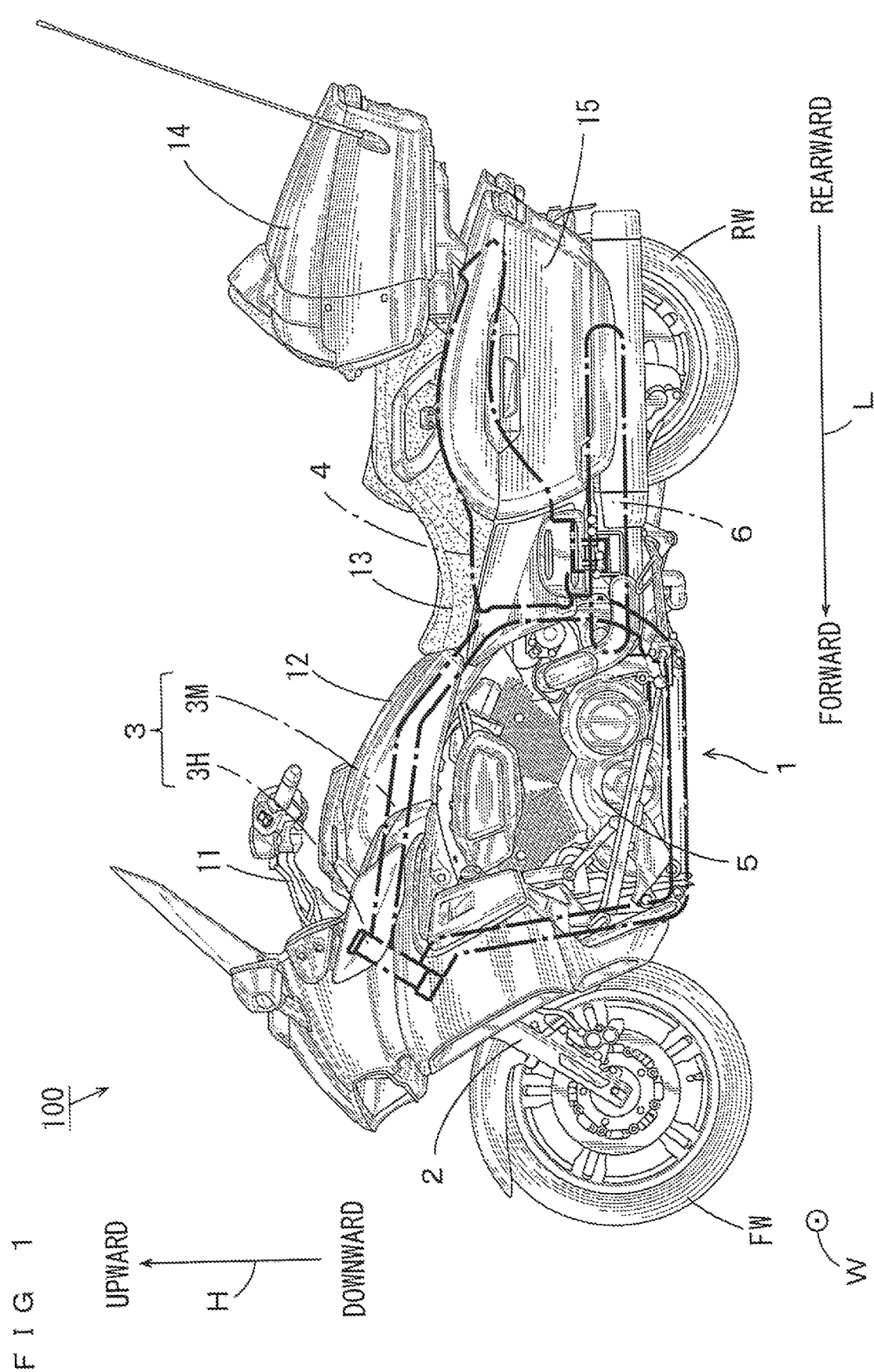
FIG. 1 is a side view of a motorcycle according to one embodiment of the present invention.

FIG. 1 is a side view of the motorcycle according to one embodiment of the present invention. In FIG. 1, the motorcycle 100 standing up to be perpendicular to the road surface is shown. In FIG. 1 and the subsequent diagrams, a front-and-rear direction L, a width direction W and a top-and-bottom direction H of the motorcycle 100 are indicated by arrows accordingly. In the following description, a direction in which the arrow is directed in the front-and-rear direction L is referred to as forward, and its opposite direction is referred to as rearward. Further, a direction in which the arrow is directed in the width direction W is referred to as leftward, and its opposite direction is referred to as rightward. A direction in which the arrow is directed in the top-and-bottom direction H is referred to as upward, and its opposite direction is referred to as downward.

As shown in FIG. 1, the motorcycle 100 according to the present embodiment is a so-called cruiser-type motorcycle. A vehicle main body 1 of the motorcycle 100 includes a front fork 2, a body frame 3, a rear frame 4, a V-type engine 5 and a swing arm 6. In FIG. 1, the body frame 3, the rear frame 4 and the swing arm 6 are indicated by thick one-dot and dash lines. The body frame 3 includes a head pipe 3H and a main frame 3M. The main frame 3M is formed to extend rearwardly and downwardly from the head pipe 3H.

The front fork 2 is attached to the head pipe 3H. A front wheel FW is rotatably provided at a lower end of the front fork 2. The engine 5 is supported at the body frame 3 via a plurality of vibration absorbing members (rubber mounts). Details of a support state of the engine 5 in the body frame 3 with use of the plurality of vibration absorbing members will be described below. The rear frame 4 is provided to extend rearwardly from a rear end of the body frame 3.

A handle 11 is provided above the head pipe 3H, and a fuel tank 12 is provided rearwardly of the handle 11. The fuel tank 12 is supported by the main frame 3M. A seat 13 is provided rearwardly of the fuel tank 12. The seat 13 is mainly supported by the rear frame 4. A rear case 14 is provided rearwardly of the seat 13.

The swing arm 6 is provided to extend rearwardly from the engine 5 in the front-and-rear direction L. Specifically, the swing arm 6 is supported at the body frame 3 together with the engine 5, and is provided downwardly of the rear frame 4 to extend rearwardly from a lower portion at a rear end of the body frame 3. Details of a support state of the swing arm 6 in the body frame 3 will be described below. A rear wheel RW is rotatably provided at a rear end of the swing arm 6. The rear wheel RW is rotated by motive power generated by the engine 5.

A pair of left and right side cases 15 is provided to overlap with rear half portions of the rear frame 4 and the swing arm 6 in the side view of the vehicle. The right and left side cases 15 are attached to the rear frame 4 to sandwich the rear half portion of the rear frame 4 in the width direction W.

(2) Body Frame 3, Engine 5 and Swing Arm 6

Figure 2:
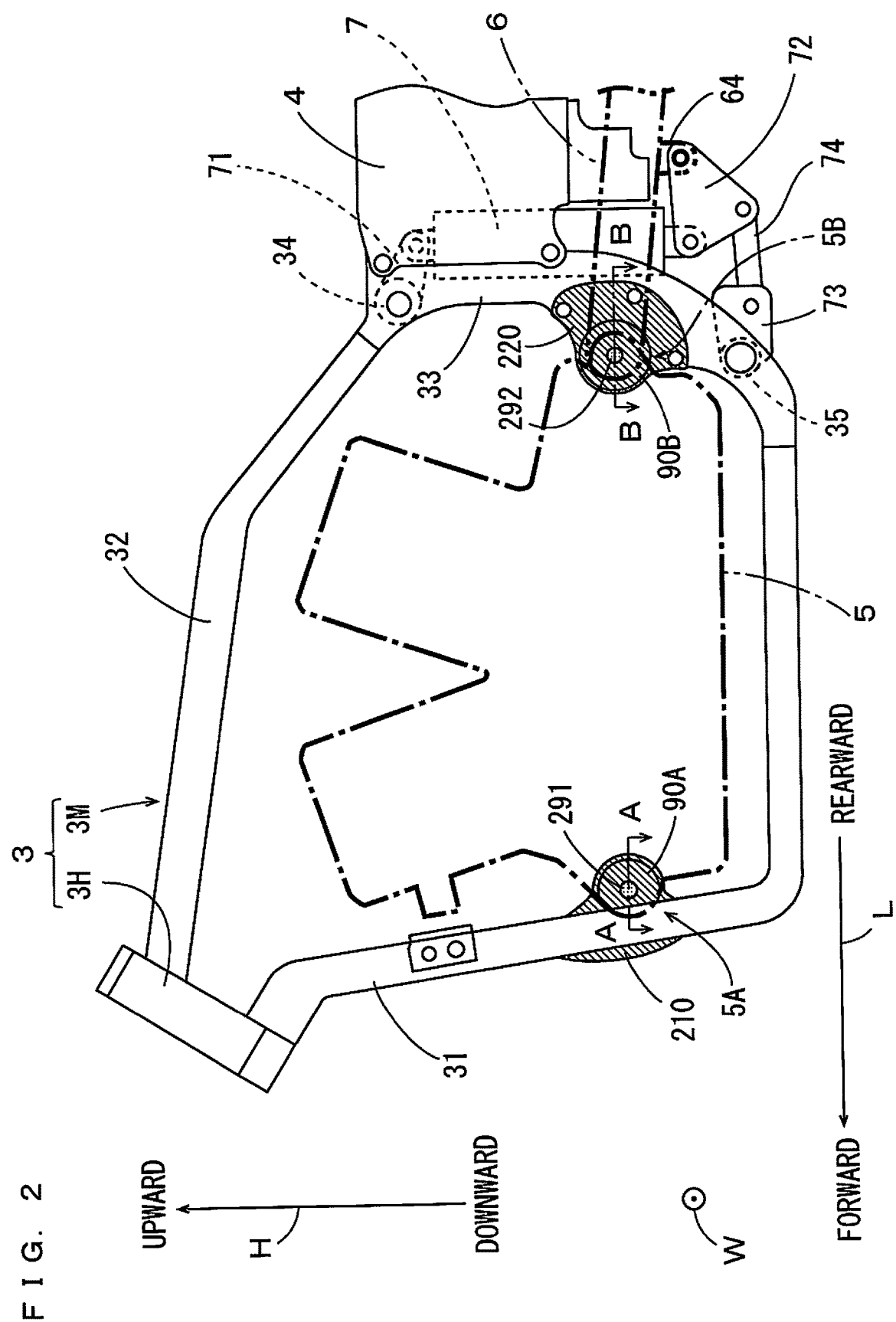
FIG. 2 is a side view showing a support state of an engine in a body frame.
Figure 3:
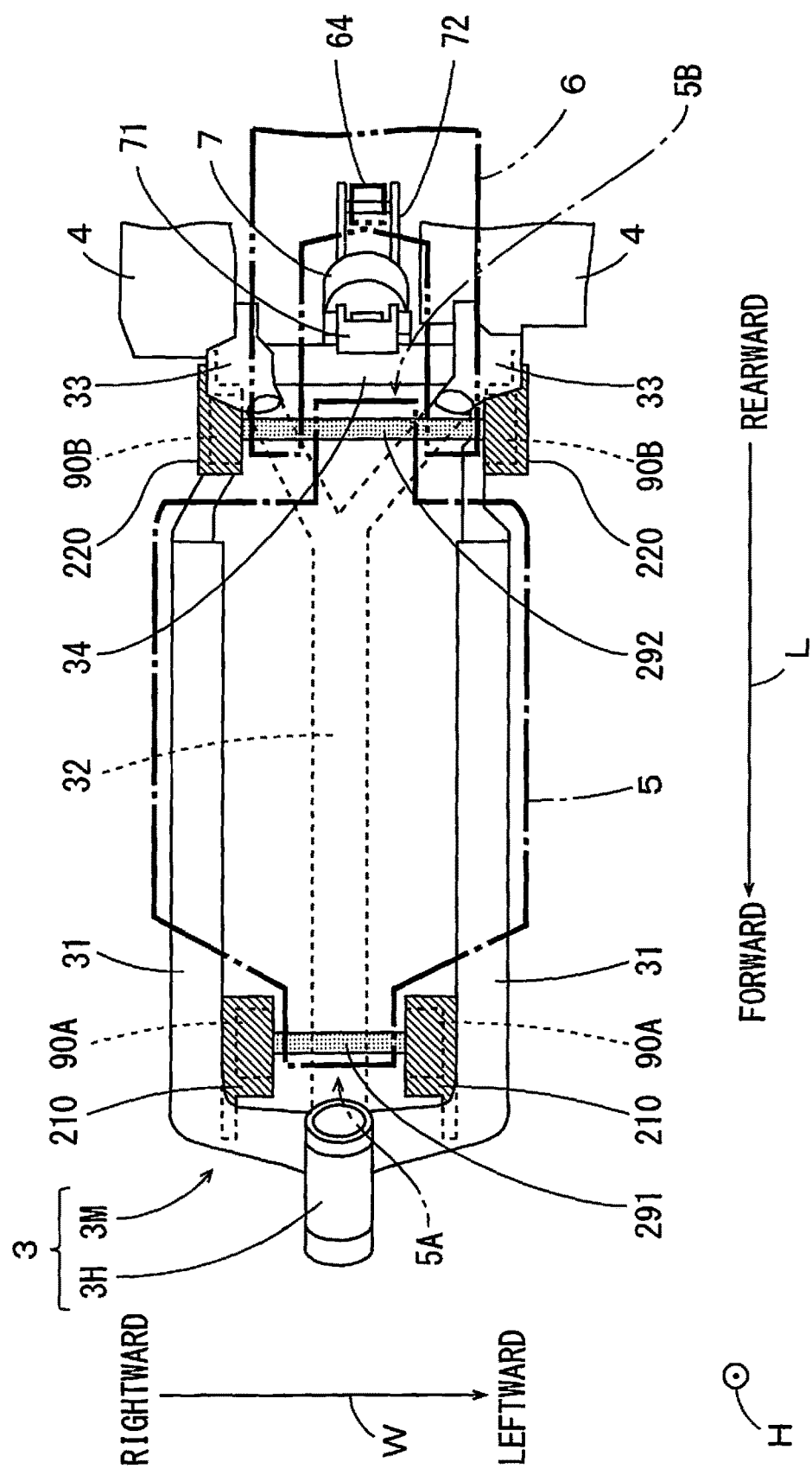
FIG. 3 is a plan view showing a support state of the engine in the body frame.
Figure 4:
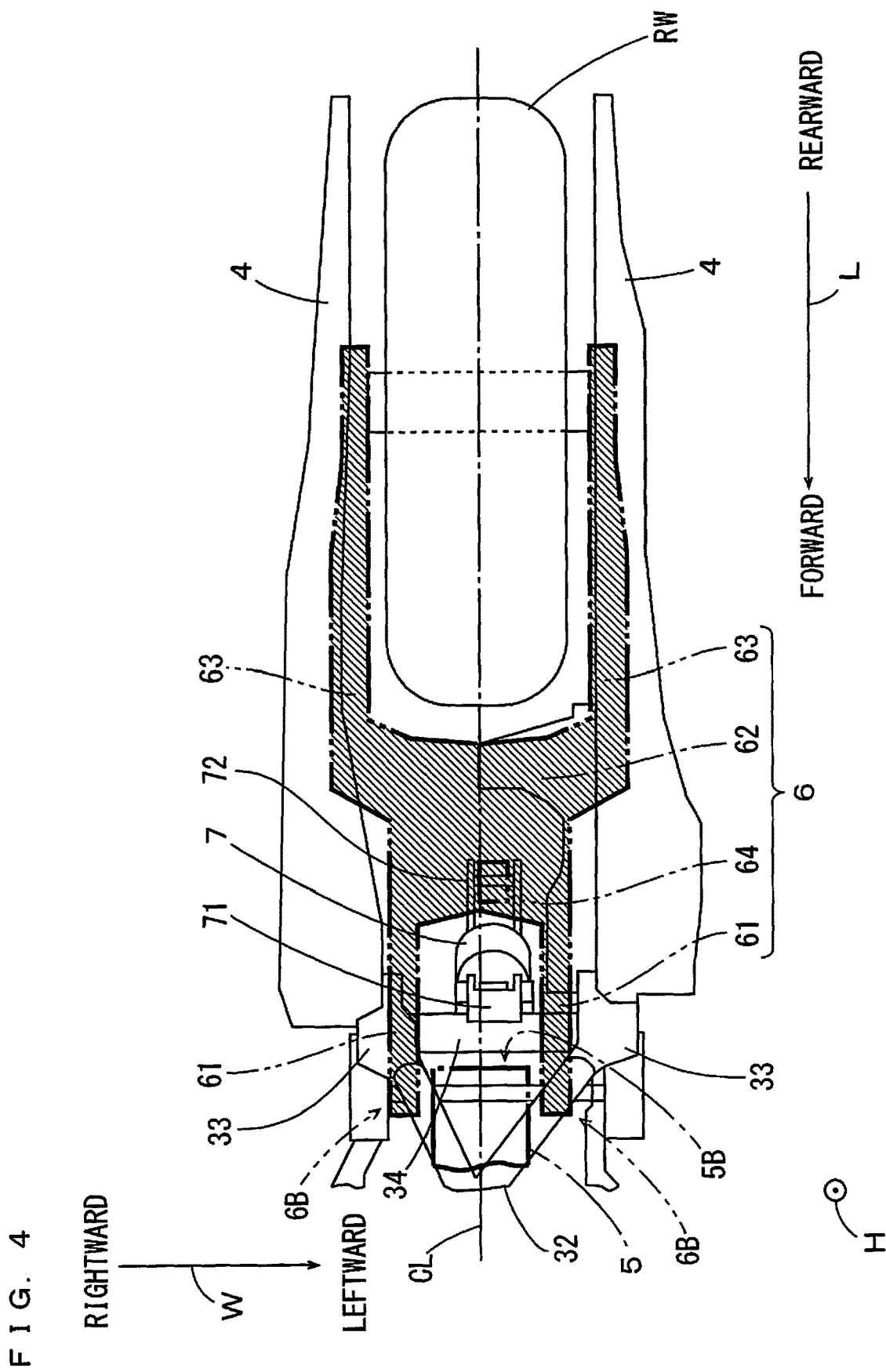
FIG. 4 is a plan view showing a support state of a swing arm in the body frame.

FIGS. 2 and 3 are a side view and a plan view showing the support state of the engine 5 in the body frame 3. FIG. 4 is a plan view showing a support state of the swing arm 6 in the body frame 3. In each of FIGS. 2 to 4, an outer edge of the engine 5 is schematically indicated by a thick one-dot and dash line, and an outer edge of the swing arm 6 is schematically indicated by a thick two-dots and dash line. Further, in FIG. 4, hatching is applied to the swing arm 6 in order to facilitate understanding of a shape of the swing arm 6. Further, in FIG. 4, a vehicle central axis CL extending in the front-and-rear direction L to pass through a center of the vehicle main body 1 in the width direction W is indicated by a one-dot and dash line.

As shown in FIGS. 2 and 3, the main frame 3M includes a pair of left and right down tubes 31, a top tube 32, a pair of left and right vertical members 33, an upper cross pipe 34 and a lower cross pipe 35.

The left down tube 31 extends from a rear portion at a lower end of the head pipe 3H to a leftward, rearward and downward position, is curved and then extends rearwardly. The right down tube 31 extends from a rear portion at a lower end of the head pipe 3H to a rightward, rearward and downward position, is curved and extends rearwardly. The top tube 32 extends rearwardly and downwardly from a rear portion at an upper end of the head pipe 3H. A rear portion of the top tube 32 branches to the left and right. The left vertical member 33 extends in the top-and-bottom direction H, and connects a rear end of the left down tube 31 to a left rear end of the top tube 32. The right vertical member 33 extends in the top-and-bottom direction H, and connects a rear end of the right down tube 31 to a right rear end of the top tube 32. The upper cross pipe 34 extends in the width direction W and connects upper ends of the left and right vertical members 33. The lower cross pipe 35 extends in the width direction W and connects lower ends of the left and right vertical members 33. The top tube 32 is indicated by dotted lines in FIG. 3. Further, the lower cross pipe 35 is not shown in each of FIGS. 3 and 4.

A pair of left and right engine brackets 210 is attached to front portions of the left and right down tubes 31. A vibration absorbing support member 90A is attached to each engine bracket 210. The left and right vibration absorbing support members 90A are opposite to each other in the width direction W. An engine support shaft 291 is provided to connect the left and right vibration absorbing support members 90A.

Further, a pair of left and right engine brackets 220 is attached to the left and right vertical members 33. The vibration absorbing support member 90B is attached to each engine bracket 220. The left and right vibration absorbing support members 90B are opposite to each other in the width direction W. An engine support shaft 292 is provided to connect the left and right vibration absorbing support members 90B.

In FIGS. 2 and 3, hatching is applied to the engine brackets 210, 220 and the vibration absorbing support members 90A, 90B, and a dotted pattern is applied to the engine support shafts 291, 292 in order to facilitate understanding of shapes of the engine brackets 210, 220, the vibration absorbing support members 90A, 90B and the engine support shafts 291, 292.

A front end portion of the engine 5 is supported at the left and right down tubes 31 via the engine support shaft 291, the pair of vibration absorbing support members 90A and the pair of engine brackets 210. A rear end portion of the engine 5 is supported at the left and right vertical members 33 via the engine support shaft 292, the pair of vibration absorbing support members 90B and the pair of engine brackets 220. In the following description, a portion, supported at the down tubes 31, of the front end portion of the engine 5 is referred to as a supported portion 5A, and another portion, supported at the vertical members 33, of the rear end portion of the engine 5 is referred to as a supported portion 5B. Through holes into which the engine support shafts 291, 292 are inserted are formed in the supported portions 5A, 5B.

A front end portion of the swing arm 6 is supported at the left and right vertical members 33 together with the rear end portion of the engine 5 via the engine support shaft 292, the vibration absorbing support members 90B and the engine brackets 220. In this state, the swing arm 6 is rigidly and pivotally connected to the engine 5 to be rotatable about the engine support shaft 292.

As shown in FIG. 4, the swing arm 6 is constituted by a pair of left and right arm front portions 61, an arm middle portion 62 and a pair of left and right arm rear portions 63. The arm middle portion 62 overlaps with the vehicle central axis CL in the plan view of the vehicle. The left and right arm front portions 61 respectively and forwardly extend from a left side portion and a right side portion of the arm middle portion 62, and are connected to the engine support shaft 292. Thus, front ends of the left and right arm front portions 61 are supported at the left and right vertical members 33 via the engine support shaft 292, the pair of vibration absorbing support members 90B and the pair of engine brackets 220. In the following description, a portion, connected to the engine support shaft 292 and supported at the vertical member 33, of each arm front portion 61 is referred to as a supported portion 6B. A through hole into which the engine support shaft 292 is inserted is formed in each supported portion 6B. The left and right arm rear portions 63 respectively and rearwardly extend from both of left and right side portions of the arm middle portion 62. Rear ends of the left and right arm rear portions 63 support the rear wheel RW at positions further rearward than the engine 5 in the front-and-rear direction L such that the rear wheel RW is rotatable.

As shown in FIG. 2, a single rear shock absorber 7 is provided to overlap with rear ends of the left and right vertical members 33 and extend in a substantially top-and-bottom direction H in the side view of the vehicle. As shown in FIG. 4, in the plan view of the vehicle, the rear shock absorber 7 is arranged between the engine 5 and the rear wheel RW in the front-and-rear direction L, and between a right end and a left end of the swing arm 6 in the width direction W.

A shock absorber bracket 71 is attached to the upper cross pipe 34. An upper end of the rear shock absorber 7 is connected to the shock absorber bracket 71. As shown in FIG. 2, a first link member 72 is connected to a lower end of the rear shock absorber 7. A shock absorber bracket 73 is attached to the lower cross pipe 35. A second link member 74 is provided to connect the shock absorber bracket 73 to the first link member 72. A shock absorber connection portion 64 is formed at a lower surface of the arm middle portion 62 (FIG. 4) of the swing arm 6 to project downwardly. The shock absorber connection portion 64 is connected to the first link member 72.

In each of a connection portion between the rear shock absorber 7 and the shock absorber bracket 71, a connection portion between the rear shock absorber 7 and the first link member 72, a connection portion between the shock absorber bracket 73 and the second link member 74, a connection portion between the second link member 74 and the first link member 72 and a connection portion between the link member 72 and the shock absorber connection portion 64, one member and the other member are relatively rotatable about an axis in parallel with the width direction W. In such a configuration, the shock absorber connection portion 64 of the swing arm 6 is supported at a lower end of the rear shock absorber 7 via the link member 72. In this case, vibration generated in the rear wheel RW is transmitted to the rear shock absorber 7 via the swing arm 6 and the first link member 72. The rear shock absorber 7 absorbs the transmitted vibration.

Figure 5:
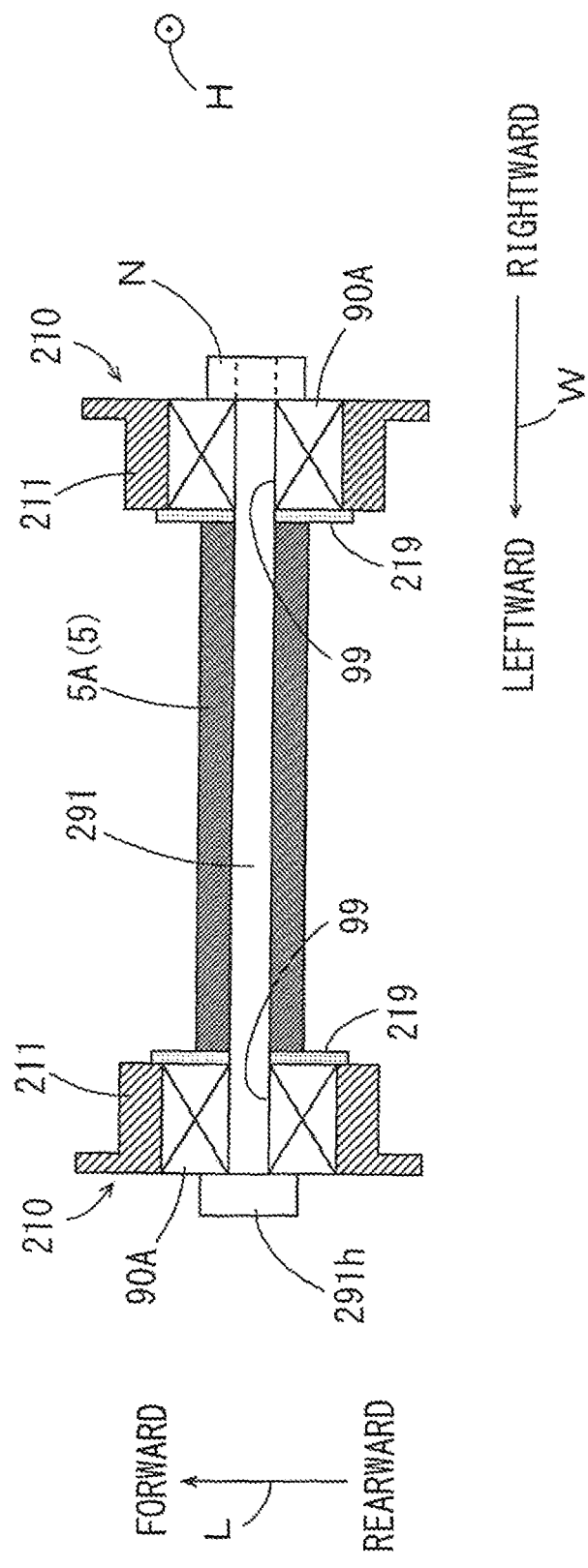
FIG. 5 is a cross sectional view taken along the line A-A of FIG. 2.
Figure 6:
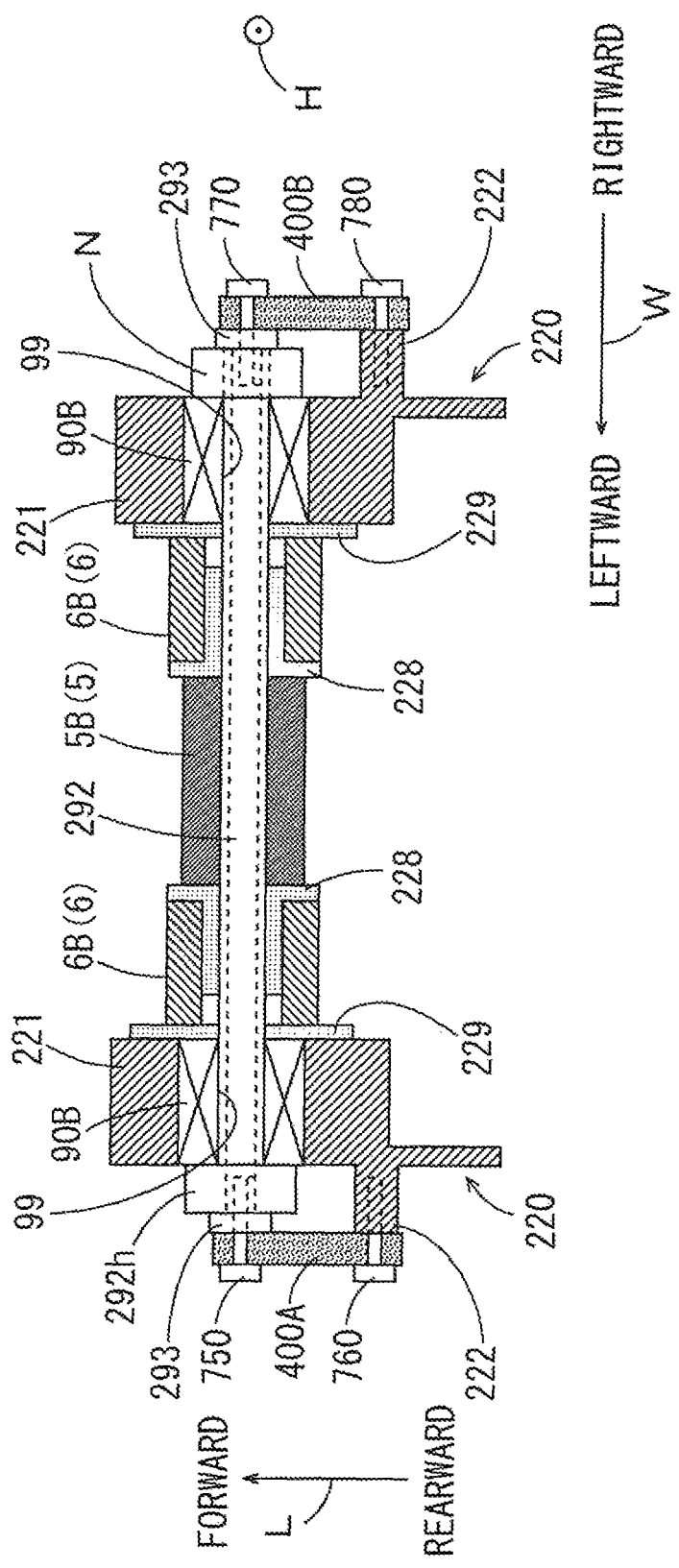
FIG. 6 is a cross sectional view taken along the line B-B of FIG. 2.

Details of the support state of the engine 5 in the body frame 3 will be described. FIG. 5 is a cross sectional view taken along the line A-A of FIG. 2, and FIG. 6 is a cross sectional view taken along the line B-B of FIG. 2. In FIGS. 5 and 6, the body frame 3 is not shown.

The vibration absorbing support members 90A, 90B used to support the engine 5 are respectively and substantially columnar. Through holes 99 into which the engine support shafts 291, 292 are inserted to extend along the central axis are formed in the respective vibration absorbing support members 90A, 90B. The vibration absorbing support members 90A, 90B basically have the same configuration except for a dimension of each portion. Details of the vibration absorbing support members 90A, 90B will be described below.

As shown in FIG. 5, in each of the left and right engine brackets 210, a substantially cylindrical fitting portion 211 is formed. The fitting portion 211 has an inner diameter substantially the same as an outer diameter of the vibration absorbing support member 90A, and is formed such that the vibration absorbing support member 90A can be fitted with the fitting portion 211.

A bolt is used as the engine support shaft 291 of FIG. 5. With the vibration absorbing support members 90A respectively fitted with the left and right engine brackets 210, the supported portion 5A of the engine 5 is arranged between the left and right vibration absorbing support members 90A. Further, a flat plate-shaped ring member 219 is arranged between the supported portion 5A and each of the left and right vibration absorbing support members 90A. In this state, the engine support shaft 291 is inserted into the through hole 99 of the right vibration absorbing support member 90A from the through hole 99 of the left vibration absorbing support member 90A via the left ring member 219, the through hole of the supported portion 5A and the right ring member 210. At this time, a head portion 291*h* of the engine support shaft 291 is located leftwardly of the left vibration absorbing support member 90A. A nut N is attached to a tip end of the engine support shaft 291 rightwardly of the right vibration absorbing support member 90A.

As shown in FIG. 6, a substantially cylindrical fitting portion 221 is formed in each of the left and right engine brackets 220. The fitting portion 221 has an inner diameter substantially the same as an outer diameter of the vibration absorbing support member 90B, and is formed such that the vibration absorbing support member 90B can be fitted with the fitting portion 221.

A hollow bolt is used as the engine support shaft 292 of FIG. 6. With the vibration absorbing support members 90B respectively fitted with the left and right engine brackets 220, the supported portion 5B of the engine 5 is arranged between the left and right vibration absorbing support members 90B. Further, the left and right supported portions 6B of the swing arm 6 are respectively arranged between the supported portion 5B and the respective left and right vibration absorbing support members 90B. Cylindrical collar members 228 are respectively inserted into through holes of the left and right supported portions 6B in advance. A flange is formed at one end of each collar member 228. Each collar member 228 is inserted into the through hole of the supported portion 6B such that the flange is in contact with the supported portion 5B. Further, flat plate-shaped ring members 229 are respectively arranged between the left vibration absorbing support member 90B and the left supported portion 6B and between the right vibration absorbing support member 90B and the right supported portion 6B. In this state, the engine support shaft 292 is inserted into the through hole 99 of the right vibration absorbing support member 90B from the through hole 99 of the left vibration absorbing support member 90B via the left ring member 229, the through hole of the left supported portion 6B, the through hole of the supported portion 5B, the through hole of the right supported portion 6B and the right ring member 229. At this time, a head portion 292*h* of the engine support shaft 292 is located leftwardly of the left vibration absorbing support member 90B. A nut N is attached to a tip end of the engine support shaft 292 rightwardly of the right vibration absorbing support member 90B.

Adapter bushes 293 are respectively attached to both ends of the engine support shaft 292. In the left engine bracket 220, a base portion 222 projecting leftwardly is formed at a position rearwardly spaced apart by the constant distance from the adapter bush 293 provided at a left end of the engine support shaft 292. In the right engine bracket 220, a base portion 222 projecting rightwardly is formed at a position rearwardly spaced apart by a constant distance from the adapter bush 293 provided at a right end of the engine support shaft 292. A yawing restricting member 400A is provided to connect the left adapter bush 293 to the left base portion 222. A yawing restricting member 400B is provided to connect the right adapter bush 293 to the right base portion 222. Details of a structure of each of the yawing restricting members 400A, 400B and their peripheral portions, and functions of the yawing restricting members 400A, 400B will be described below.

FIGS. 7A to 7C are diagrams for explaining a configuration of the vibration absorbing support members 90A, 90B of FIGS. 5 and 6. In FIG. 7A, a diagram showing the appearance of each of the vibration absorbing support members 90A, 90B as viewed in directions in parallel with their central axes is shown. A cross sectional view taken along the line C-C of FIG. 7A is shown in FIG. 7B, and a cross sectional view taken along the line D-D of FIG. 7A is shown in FIG. 7C.

As shown in FIGS. 7A to 7C, each of the vibration absorbing support members 90A, 90B includes an outer cylinder 91, an inner cylinder 92, a plurality (four in the present example) of extension contraction amount restricting members 93 and a rubber member 94. The outer cylinder 91, the inner cylinder 92 and the plurality of extension contraction amount restricting members 93 are formed of metal such as stainless or an aluminum alloy.

The outer cylinder 91 and the inner cylinder 92 have the same length in an axis direction. The inner cylinder 92 is arranged in the outer cylinder 91. The above-mentioned through holes 99 of the vibration absorbing support members 90A, 90B are formed of inner peripheral surfaces of the inner cylinders 92. Each of the plurality of extension contraction amount restricting members 93 is a strip-shaped member having the same length as that of the inner cylinder 92 and the outer cylinder 91, and is connected to an outer peripheral surface of the inner cylinder 92 to extend in parallel with a central axis of the inner cylinder 92. In a circumferential direction of the inner cylinder 92, the plurality of extension contraction amount restricting members 93 are arranged at equal angular intervals. Each extension contraction amount restricting member 93 extends in a radial direction of the outer cylinder 91 and the inner cylinder 92 from an outer peripheral surface of the inner cylinder 92.

The rubber member 94 is provided between the outer cylinder 91 and the inner cylinder 92, and includes a plurality (four in the present example) of projections 95 and a plurality (four in the present example) of recesses 96. Each projection 95 is formed between two adjacent extension contraction amount restricting members 93 in a circumferential direction of the inner cylinder 92. Further, each projection 95 extends in the radial direction of the outer cylinder 91 and the inner cylinder 92 from an outer peripheral surface of the inner cylinder 92 and is in contact with an inner peripheral surface of the outer cylinder 91. Each recess 96 is formed between two adjacent projections 95 in the circumferential direction of the inner cylinder 92. Part of each recess 96 covers an outer surface of the extension contraction amount restricting member 93.

A maximum total thickness TT (FIG. 7C) of each extension contraction amount restricting member 93 and the recess 96 of the rubber member 94 covering the extension contraction amount restricting member 93 in the radial direction of the outer cylinder 91 and the inner cylinder 92 is smaller than ½ of a difference between the inner diameter of the outer cylinder 91 and the outer diameter of the inner cylinder 92. Thus, the recess 96 of the rubber member 94 is not in contact with the inner peripheral surface of the outer cylinder 91 with the center axes of the outer cylinder 91 and the inner cylinder 92 coinciding with each other.

As shown in FIG. 7B, a maximum thickness (thickness of each projection 95) T95 of the rubber member 94 in the radial direction of the outer cylinder 91 and the inner cylinder 92 is set equal to or larger than ½ of an inner diameter (an inner diameter of the through hole 99) I92 of the inner cylinder 92. Thus, each of the vibration absorbing support members 90A, 90B has high vibration absorbing capacity. Thus, vibration generated in the engine 5 and the swing arm 6 is absorbed by the vibration absorbing support members 90A, 90B via the engine support shafts 291, 292. In particular, in the present embodiment, in the vibration absorbing support member 90A that supports the front end portion (the supported portion 5A) of the engine 5, the maximum thickness T95 of the rubber member 94 in the radial direction of the outer cylinder 91 and the inner cylinder 92 is set equal to or larger than the inner diameter I92 of the inner cylinder 92. In this case, vibration of the engine 5 is sufficiently absorbed by the vibration absorbing support member 90A.

As described above, in the vibration absorbing support members 90A, 90B, the plurality of projections 95 of the rubber member 94 are arranged in the circumferential direction of the outer cylinder 91 and the inner cylinder 92 at equal angular intervals, and the plurality of recesses 96 are arranged in the circumferential direction at equal angular intervals. Thus, the rubber member 94 can equally extend and contract.

Here, when large-amplitude vibration is applied to each of the vibration absorbing support members 90A, 90B, an amount of shape change of the projections 95 of the rubber member 94 increases. Even in such a case, the plurality of metallic extension contraction amount restricting members 93 are present between the outer cylinder 91 and the inner cylinder 92. The plurality of extension contraction amount restricting members 93 prevent the inner peripheral surface of the outer cylinder 91 from being in contact with the outer peripheral surface of the inner cylinder 92, and restricts an amount of extension and contraction of the projections 95 of the rubber member 94 within a constant range. Thus, a change amount of relative positions between the body frame 3 and the engine 5 is inhibited from excessively increasing, and swinging of the engine 5 is restricted within a constant range.

In each of the vibration absorbing support members 90A, 90B, the inner peripheral surface of the outer cylinder 91 may be covered with rubber. Thus, the metallic extension contraction amount restricting members 93 are inhibited from directly being in contact with the outer cylinder 91. Further, in each of the vibration absorbing support members 90A, 90B, disc-shaped lids respectively having through holes corresponding to the through hole 99 may be provided at both ends in the axis direction. The lids cover end surfaces of the vibration absorbing support members 90A, 90B, so that contaminants are prevented from entering the vibration absorbing support members 90A, 90B. The lids are formed of rubber, for example.

(3) Countermeasure for Pitching, Yawing and Rolling of Engine 5

As described above, a large part of vibration generated in the engine 5 and the swing arm 6 is absorbed by the vibration absorbing support members 90A, 90B. Thus, when relative positions of the engine 5 and the swing arm 6 with respect to the body frame 3 are changed, pitching, yawing and rolling of the engine 5 with respect to the body frame 3 increase. Therefore, in the present embodiment, two pitching restricting members, two yawing restricting members and one rolling restricting member are provided between the body frame 3 and the engine 5.

FIGS. 8 to 11 are diagrams for explaining an outline of attachment positions and attachment states of the pitching restricting members, the yawing restricting members and the rolling restricting member. In each of FIGS. 8 to 11, the outer edge of the engine 5 is schematically indicated by thick solid lines. Further, similarly to FIGS. 2 and 3, hatching is applied to the engine brackets 210, 220 and the vibration absorbing support members 90A, 90B. Further, in FIG. 8, a dotted pattern is applied to the engine support shafts 291, 292.

Figure 8:
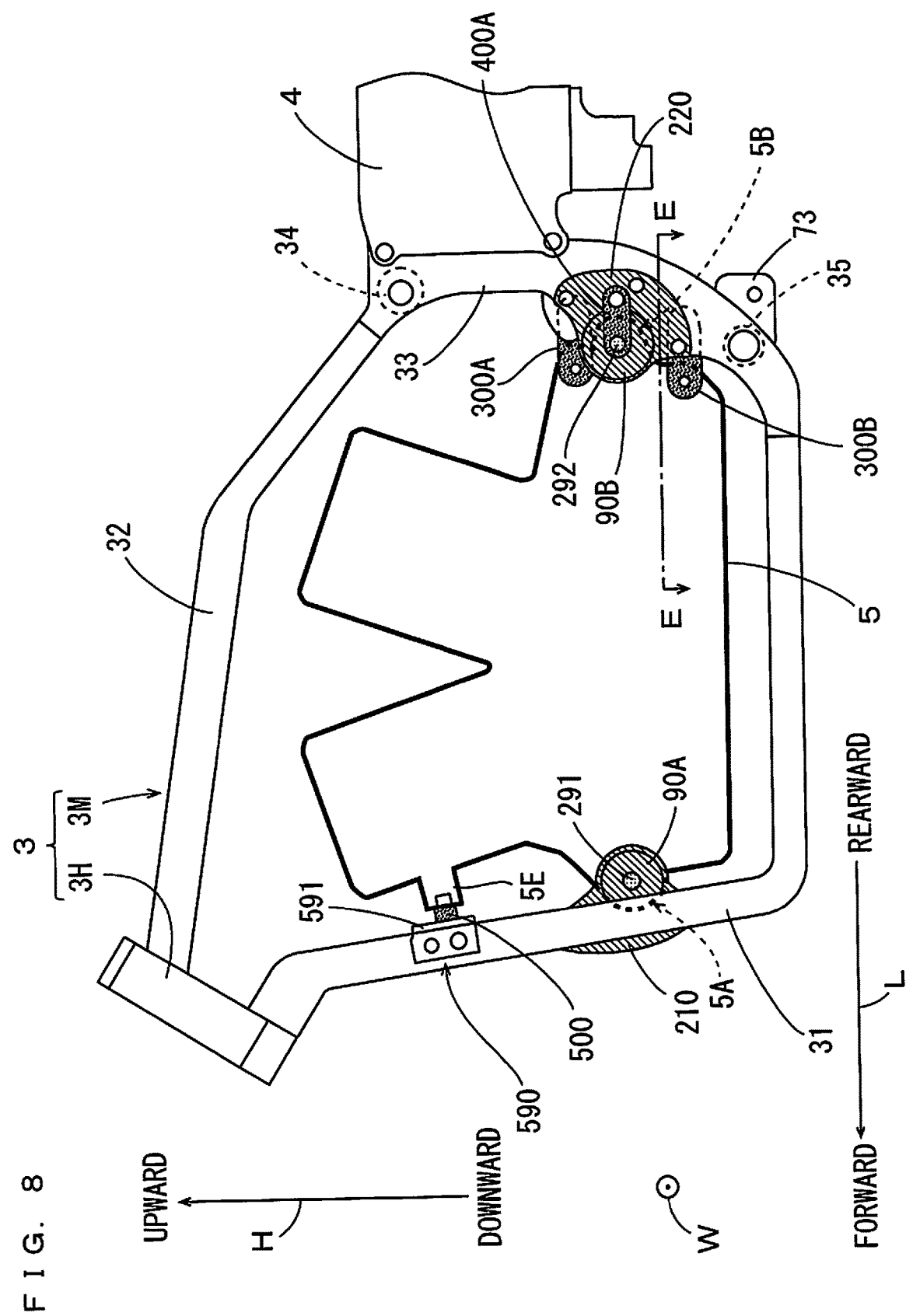
FIG. 8 is a diagram for explaining an outline of attachment positions and attachment states of pitching restricting members, yawing restricting members and rolling restricting members.
Figure 9:
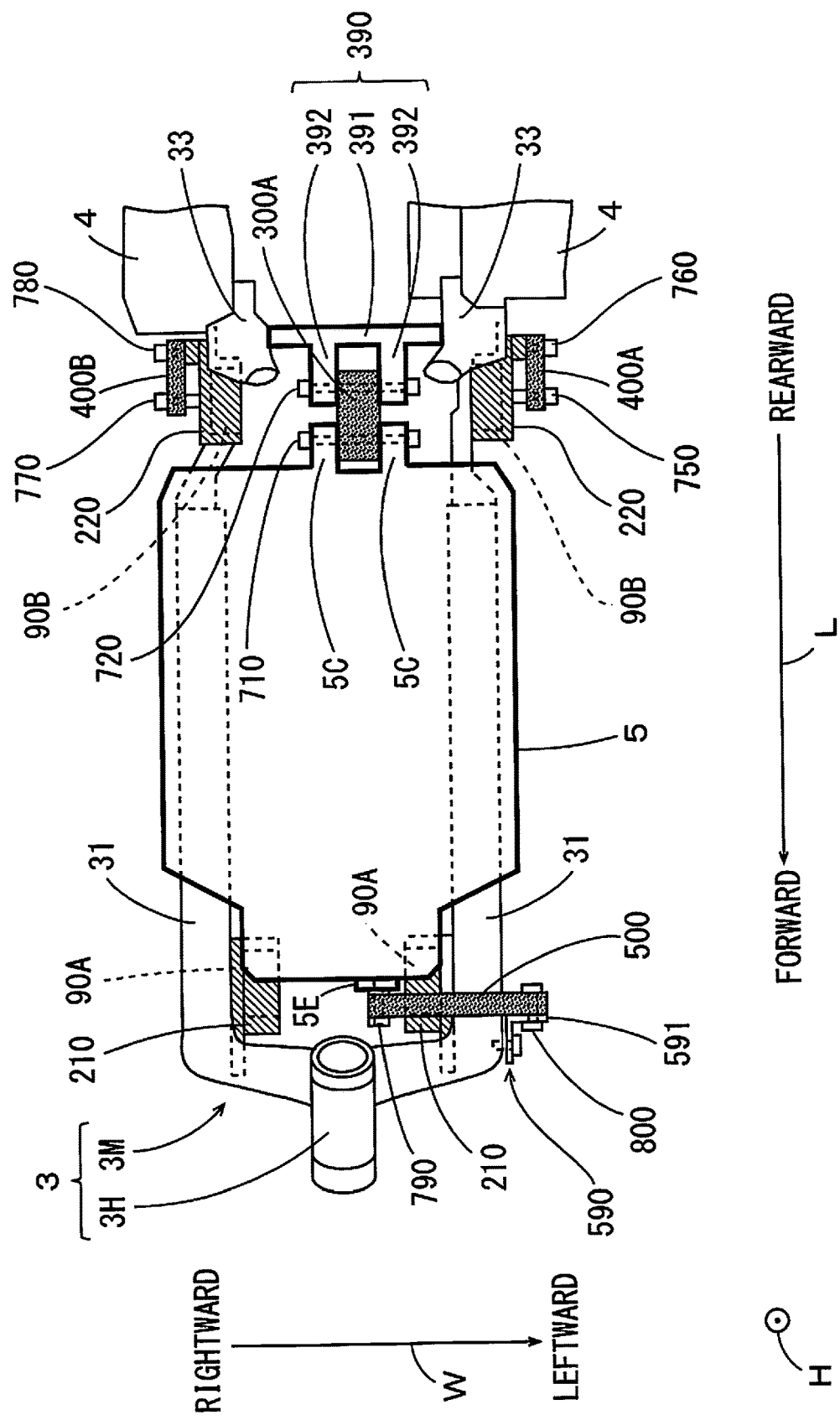
FIG. 9 is a diagram for explaining an outline of the attachment positions and the attachment states of the pitching restricting members, the yawing restricting members and the rolling restricting members.
Figure 10:
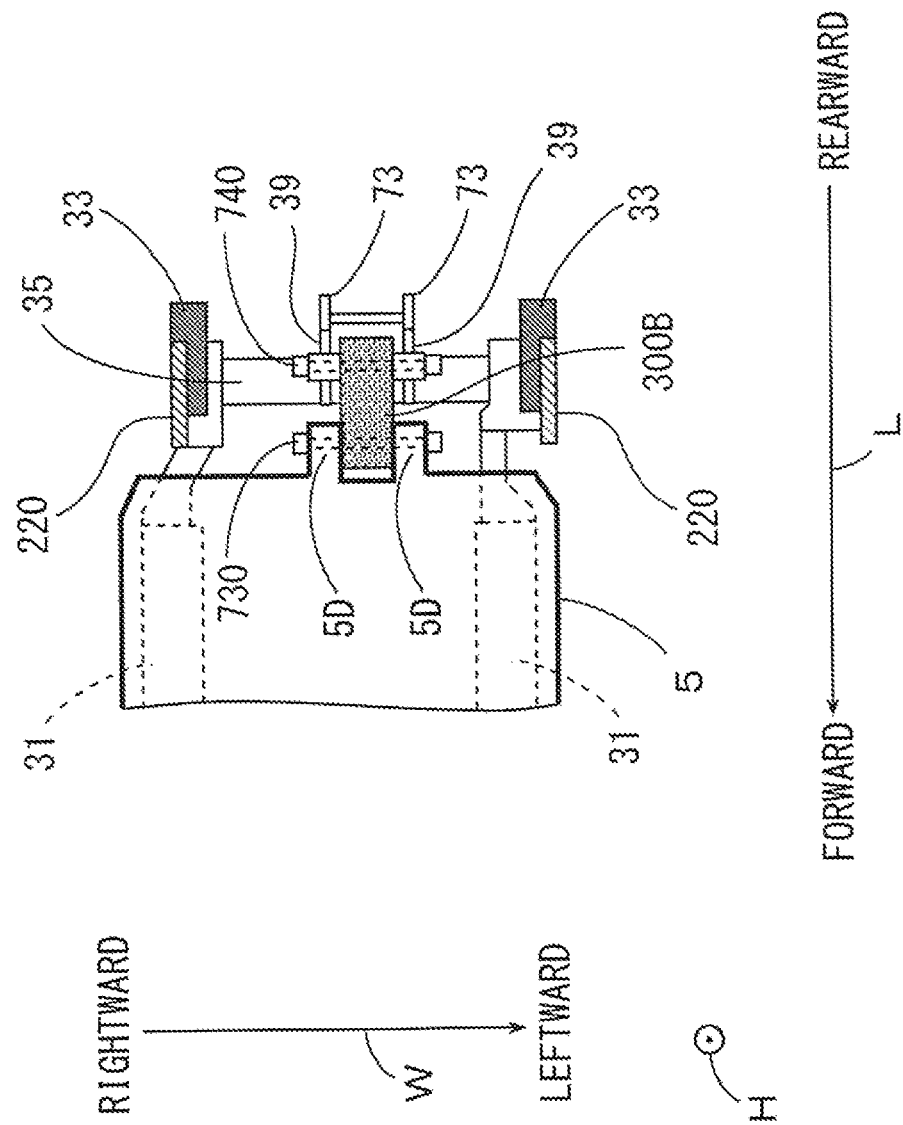
FIG. 10 is a diagram for explaining an outline of the attachment positions and the attachment states of the pitching restricting members, the yawing restricting members and the rolling restricting members.
Figure 11:
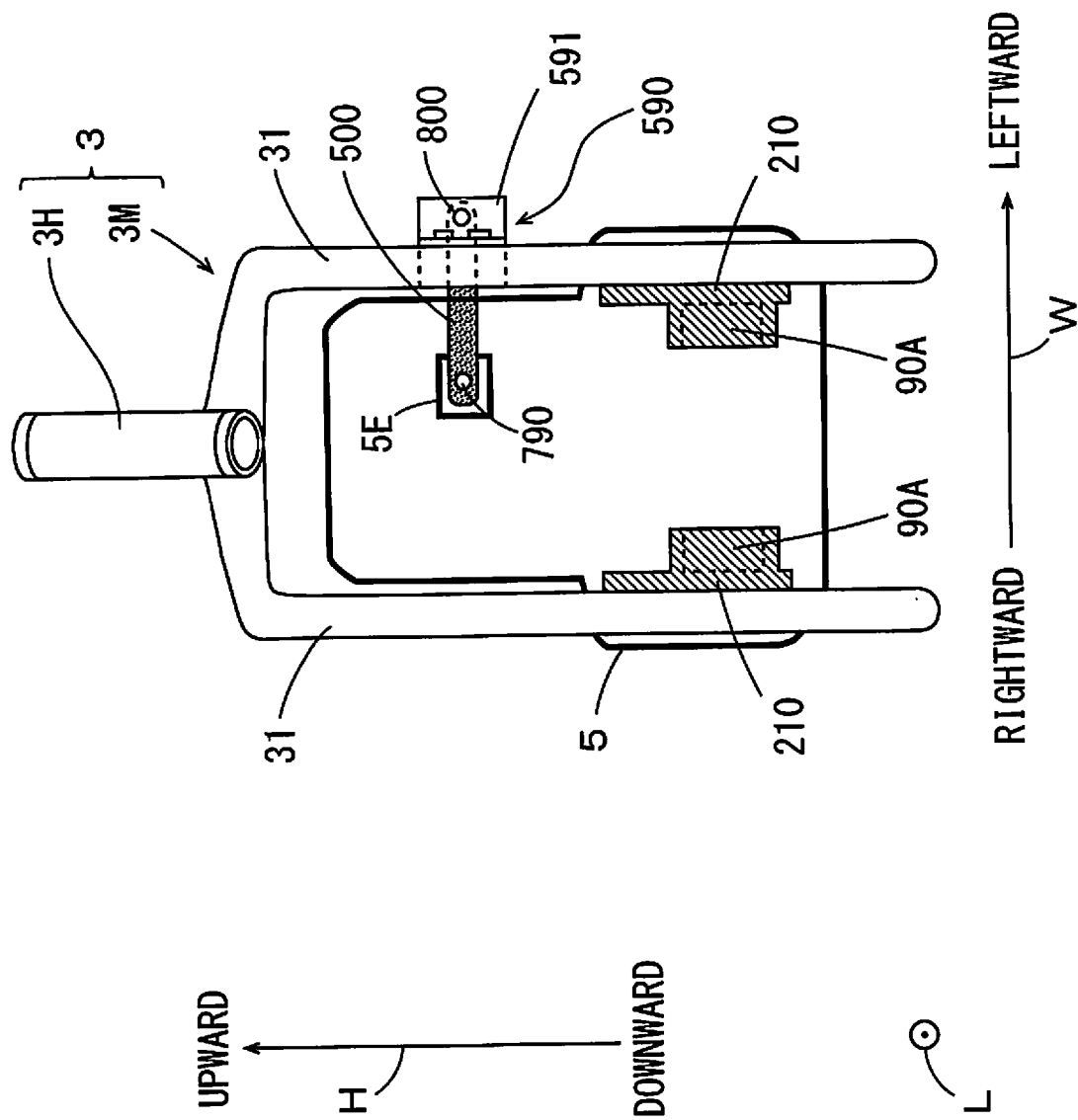
FIG. 11 is a diagram for explaining an outline of the attachment positions and the attachment states of the pitching restricting members, the yawing restricting members and the rolling restricting members.

A side view of the body frame 3 and the engine 5 is shown in FIG. 8, and a plan view of the body frame 3 and the engine 5 is shown in FIG. 9. A cross sectional view taken along the line E-E of FIG. 8 is shown in FIG. 10, and a front view of the body frame 3 and the engine 5 is shown in FIG. 11. In FIG. 9, the top tube 32 (FIG. 2), the upper cross pipe 34 (FIG. 2) and the lower cross pipe 35 (FIG. 2) of the body frame 3 are not shown.

As shown in FIG. 8, the pitching restricting members 300A, 300B are arranged to sandwich the engine support shaft 292 in the top-and-bottom direction H in the side view of the vehicle. The pitching restricting member 300A is provided at a position further upward than the engine support shaft 292 to extend in the front-and-rear direction L. The other pitching restricting member 300B is provided at a position further downward than the engine support shaft 292 to extend in the front-and-rear direction L.

As shown in FIG. 9, an upper pitching bracket 390 is provided between the pair of vertical members 33. The upper pitching bracket 390 is located at a substantially center portion of the pair of vertical members 33 in the top-and-bottom direction H, and has a connecting portion 391 and a pair of left and right support portions 392. The connecting portion 391 is attached to the pair of vertical members 33 to extend in the width direction W and connect portions, which are opposite to each other, of the vertical members 33. The pair of support portions 392 extends forwardly from a substantially center portion of the connecting portion 391 while being spaced apart from each other by a predetermined distance in the width direction W. In the engine 5 supported at the body frame 3, a pair of left and right upper pitching supported portions 5C is formed forwardly of the pair of support portions 392 of the upper pitching bracket 390.

One end of the pitching restricting member 300A is arranged between the pair of upper pitching supported portions 5C, and is attached to the engine 5 by a connecting shaft 710 extending in the width direction W. In this state, the one end of the pitching restricting member 300A is swingable about the connecting shaft 710. On the other hand, the other end of the pitching restricting member 300A is arranged between the pair of support portions 392, and is attached to the body frame 3 via the upper pitching bracket 390 by a connecting shaft 720 extending in the width direction W. In this state, the other end of the pitching restricting member 300A is swingable about the connecting shaft 720.

As shown in FIG. 10, a pair of left and right support members 39 is attached to a substantially center portion of the lower cross pipe 35. The pair of support members 39 extends upwardly from the substantially center portions of the lower cross pipe 35 while being spaced apart from each other by a predetermined distance in the width direction W. In the engine 5 supported at the body frame 3, a pair of left and right lower pitching supported portions 5D is formed forwardly of upper ends of the pair of support members 39.

One end of the pitching restricting member 300B is arranged between the pair of lower pitching supported portions 5D, and is attached to the engine 5 by a connecting shaft 730 extending in the width direction W. In this state, the one end of the pitching restricting member 300B is swingable about the connecting shaft 730. On the other hand, the other end of the pitching restricting member 300B is arranged between upper ends of the pair of support members 39, and is attached to the body frame 3 via the pair of support members 39 by a connecting shaft 740 extending in the width direction W. In this state, the other end of the pitching restricting member 300B is swingable about the connecting shaft 740.

In this manner, the engine 5 is connected to the body frame 3 by the upper and lower pitching restricting members 300A, 300B, so that pitching of the engine 5 with respect to the body frame 3 is restricted. Thus, the engine 5 is supported at the body frame 3 against a counterforce from the rear shock absorber 7. Further, forward-rearward movement of the engine 5 is restricted. On the other hand, the pitching restricting members 300A, 300B swing, so that the engine 5 can move in the top-and-bottom direction H with respect to the body frame 3.

As shown in FIG. 9, in the plan view of the vehicle, the yawing restricting member 400A is arranged at a position further leftward than the left vertical member 33 of the body frame 3, and the yawing restricting member 400B is arranged at a position further rightward than the right vertical member 33 of the body frame 3. The yawing restricting members 400A, 400B are provided to extend in the front-and-rear direction L.

Details of attachment states of the yawing restricting members 400A, 400B are shown in the above-mentioned FIG. 6. As shown in FIG. 6, one end of the left yawing restricting member 400A is attached to the left adapter bush 293 by a connecting shaft 750 extending in the width direction W. In this state, the one end of the yawing restricting member 400A is swingable about the connecting shaft 750. On the other hand, the other end of the left yawing restricting member 400A is attached to the base portion 222 of the left engine bracket 220 by a connecting shaft 760 extending in the width direction W. In this state, the other end of the yawing restricting member 400A is swingable about the connecting shaft 760.

Further, one end of the right yawing restricting member 400B is attached to the right adapter bush 293 by a connecting shaft 770 extending in the width direction W. In this state, one end of the yawing restricting member 400B is swingable about the connecting shaft 770. On the other hand, the other end of the right yawing restricting member 400B is attached to the base portion 222 of the right engine bracket 220 by a connecting shaft 780 extending in the width direction W. In this state, the other end of the yawing restricting member 400B is swingable about the connecting shaft 780.

In this manner, the engine 5 is connected to the body frame 3 by the left and right yawing restricting members 400A, 400B via the engine support shaft 292 and the left and right adapter bushes 293, whereby yawing of the engine 5 with respect to the body frame 3 is restricted. Thus, the swing arm 6 rigidly connected to the engine 5 is prevented from swinging to the left and right. On the other hand, the yawing restricting members 400A, 400B swing, so that the engine 5 can move in the top-and-bottom direction H with respect to the body frame 3.

As shown in FIGS. 8 and 9, a rolling bracket 590 is provided at a portion further upward than the attachment position of the engine bracket 210 in the left down tube 31 of the body frame 3.

As shown in FIG. 11, the rolling bracket 590 has a support portion 591 projecting leftwardly from a left side edge of the left down tube 31. In the engine 5 supported at the body frame 3, a rolling supported portion 5E is formed rightwardly of the support portion 591 of the rolling bracket 590. The height of the support portion 591 and the height of the rolling supported portion 5E in the top-and-bottom direction H are substantially the same.

A rolling restricting member 500 is provided to connect the rolling supported portion 5E to the support portion 591. As shown in FIGS. 9 and 11, the rolling restricting member 500 extends in the width direction W in the plan and front views of the vehicle.

Specifically, as shown in FIG. 11, one end of the rolling restricting member 500 is arranged forwardly of the rolling supported portion 5E to overlap with the rolling supported portion 5E in the front view of the vehicle, and is attached to the engine 5 by a connecting shaft 790 extending in the front-and-rear direction L. In this state, one end of the rolling restricting member 500 is swingable about the connecting shaft 790. On the other hand, the other end of the rolling restricting member 500 is arranged rearwardly of the support portion 591 to overlap with the rolling bracket 590 in the front view of the vehicle, and is attached to the support portion 591 by a connecting shaft 800 extending in the front-and-rear direction L. In this state, the other end of the rolling restricting member 500 is swingable about the connecting shaft 800.

In this manner, the engine 5 is connected to the body frame 3 by the rolling restricting member 500 extending in the width direction W, whereby rolling of the engine 5 with respect to the body frame 3 is restricted. On the other hand, the rolling restricting member 500 swings, so that the engine 5 can move in the top-and-bottom direction H with respect to the body frame 3. Further, in the present example, the rolling restricting member 500 is arranged at a position further forward than the pair of pitching restricting members 300A, 300B and the pair of yawing restricting members 400A, 400B in the front-and-rear direction L. In this case, stability of support of the engine 5 with respect to the body frame 3 is improved.

(4) Effects of Embodiments

In the motorcycle 100 according to the present embodiment, the swing arm 6 extends rearwardly from the engine 5 in the front-and-rear direction L, and the pair of side cases 15 is arranged leftwardly and rightwardly of the swing arm 6 in the plan view of the vehicle. The swing arm 6 is supported at the body frame 3 by the single rear shock absorber 7. The rear wheel RW is supported at the swing arm 6 at a position further rearward than the engine 5. The single rear shock absorber 7 is arranged between the engine 5 and the rear wheel RW and between the right end and the left end of the swing arm 6. Thus, in a configuration in which the pair of side cases 15 is provided, it is not necessary to respectively provide a pair of rear shock absorbers 7 between the rear wheel RW and the pair of respective side cases 15. Therefore, capacity of the side cases 15 can be ensured, and the size of the motorcycle 100 in the width direction W can be inhibited from increasing.

The engine 5 is supported at the body frame 3 by the plurality of vibration absorbing support members 90A, 90B. Each of the vibration absorbing support members 90A, 90B has a structure in which the rubber member 94 is arranged between the outer cylinder 91 and the inner cylinder 92. The engine 5 is attached to the inner cylinder 92 with use of the engine support shafts 291, 292, and the body frame 3 is attached to the outer cylinder 91 with use of the engine brackets 210, 220. The rubber member 94 has the projections 95 being in contact with the inner surface of the outer cylinder 91 and the recesses 96 not being in contact with the inner surface of the outer cylinder 91. The maximum thickness (thickness of each projection 95) T95 of the rubber member 94 in the radial direction of the outer cylinder 91 and the inner cylinder 92 is equal to or larger than ½ of the inner diameter of the inner cylinder 92. Thus, each of the vibration absorbing support members 90A, 90B has high vibration absorbing capacity.

The swing arm 6 is rigidly and pivotally connected to the engine 5 to be rotatable about the engine support shaft 292. Therefore, a distance, between a driving sprocket rotated by the motive power of the engine 5 and a driven sprocket provided at the swing arm 6 to be rotatable together with the rear wheel RW, does not change. On the other hand, the engine 5 swings due to vibration or the like generated in the rear wheel RW and the swing arm 6 depending on a condition of a road surface.

The engine 5 and the body frame 3 are connected to each other by the pitching restricting members 300A, 300B. Thus, pitching of the engine 5 with respect to the body frame 3 is restricted. Further, the engine 5 and the body frame 3 are connected to each other by the yawing restricting members 400A, 400B. Thus, yawing of the engine 5 with respect to the body frame 3 is restricted. Further, the engine 5 and the body frame 3 are connected to each other by the rolling restricting member 500. Thus, rolling of the engine 5 with respect to the body frame 3 is restricted. The pitching restricting members 300A, 300B, the yawing restricting members 400A, 400B and the rolling restricting member 500 are provided to allow vibration of the engine 5 in the top-and-bottom direction H. Therefore, a direction in which the engine 5 swings is limited to the top-and-bottom direction H.

In this case, vibration of the engine 5 is absorbed by the plurality of vibration absorbing support members 90A, 90B while swinging of the engine 5 in the top-and-bottom direction H is allowed. Thus, vibration transmitted from the engine 5 to the body frame 3 is reduced.

As a result, the vibration transmitted from the engine 5 to the rider is reduced, and good drivability can be ensured.

The engine 5 and the swing arm 6 are attached to the engine support shaft 292 inserted into the inner cylinders 92 of the pair of left and right vibration absorbing support members 90B. In this case, the swing arm 6 is rigidly and pivotally connected to the engine 5 with use of the engine support shaft 292 to be rotatable about the engine support shaft 292, and the engine 5 is attached to the inner cylinders 92 of the vibration absorbing support members 90B with use of the engine support shaft 292. Thus, the number of components is reduced.

In the present embodiment, the engine 5 is supported at the body frame 3 by the pair of left and right vibration absorbing support members 90A and the pair of left and right vibration absorbing support members 90B. Therefore, the engine 5 can be stably supported with respect to the body frame 3 by the small number of the vibration absorbing support members 90A, 90B.

(5) Details of Attachment Structure of Upper Pitching Restricting Member 300A

Figure 12:
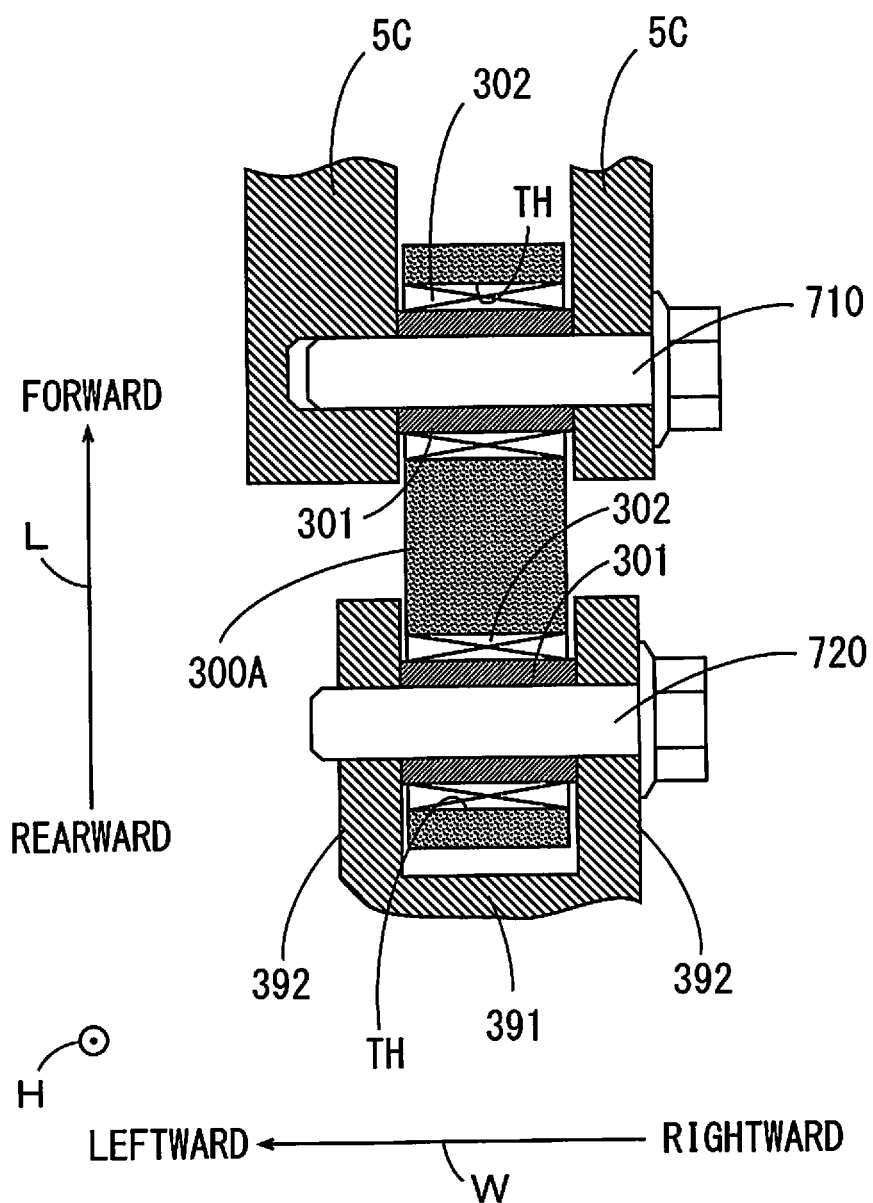
FIG. 12 is a cross sectional view for explaining an attachment structure of an upper pitching restricting member in more detail.

FIG. 12 is a cross sectional view for explaining the attachment structure of the upper pitching restricting member 300A in more detail. As shown in FIG. 12, bolts are used as the connecting shafts 710, 720 in the present embodiment. Through holes TH are formed in both ends of the pitching restricting member 300A. The connecting shaft 710 is inserted into the through hole TH formed in one end of the pitching restricting member 300A via a collar member 301 and a bearing 302. The connecting shaft 710 is inserted into the through hole TH formed in the other end of the pitching restricting member 300A via a collar member 301 and a bearing 302. Thus, both ends of the pitching restricting member 300A respectively and smoothly swing about the connecting shafts 710, 720.

(6) Attachment Structure of Lower Pitching Restricting Member 300B

Figure 13:
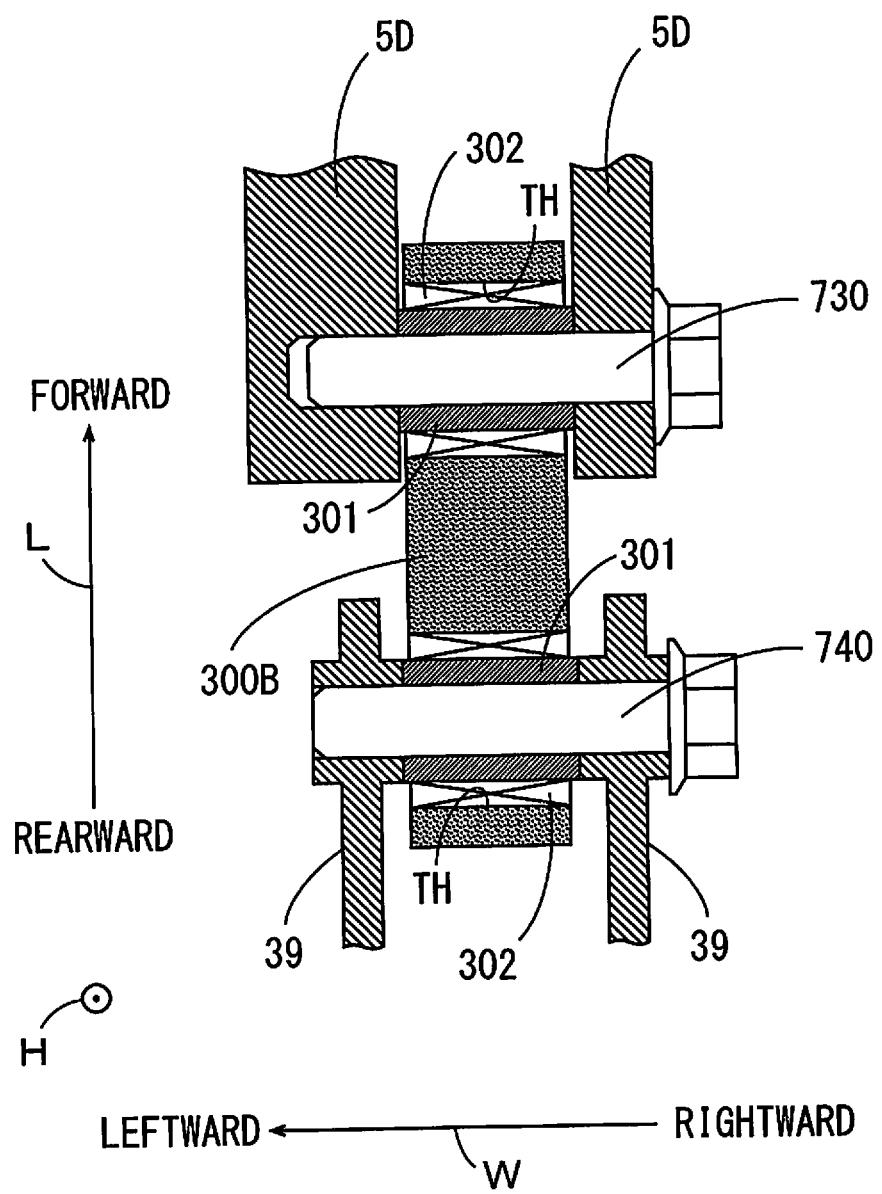
FIG. 13 is a cross sectional view for explaining an attachment structure of a lower pitching restricting member in more detail.

FIG. 13 is a cross sectional view for explaining the attachment structure of the lower pitching restricting member 300B in more detail. As shown in FIG. 13, bolts are used as the connecting shafts 730, 740 in the present embodiment. Through holes TH are formed in both ends of the pitching restricting member 300B. The connecting shaft 730 is inserted into the through hole TH formed in one end of the pitching restricting member 300B via a collar member 301 and a bearing 302. The connecting shaft 740 is inserted into the through hole TH formed in the other end of the pitching restricting member 300B via a collar member 301 and a bearing 302. Thus, both ends of the pitching restricting members 300B respectively and smoothly swing about the connecting shafts 730, 740.

(7) Attachment Structure of Left Yawing Restricting Member 400A

Figure 14:
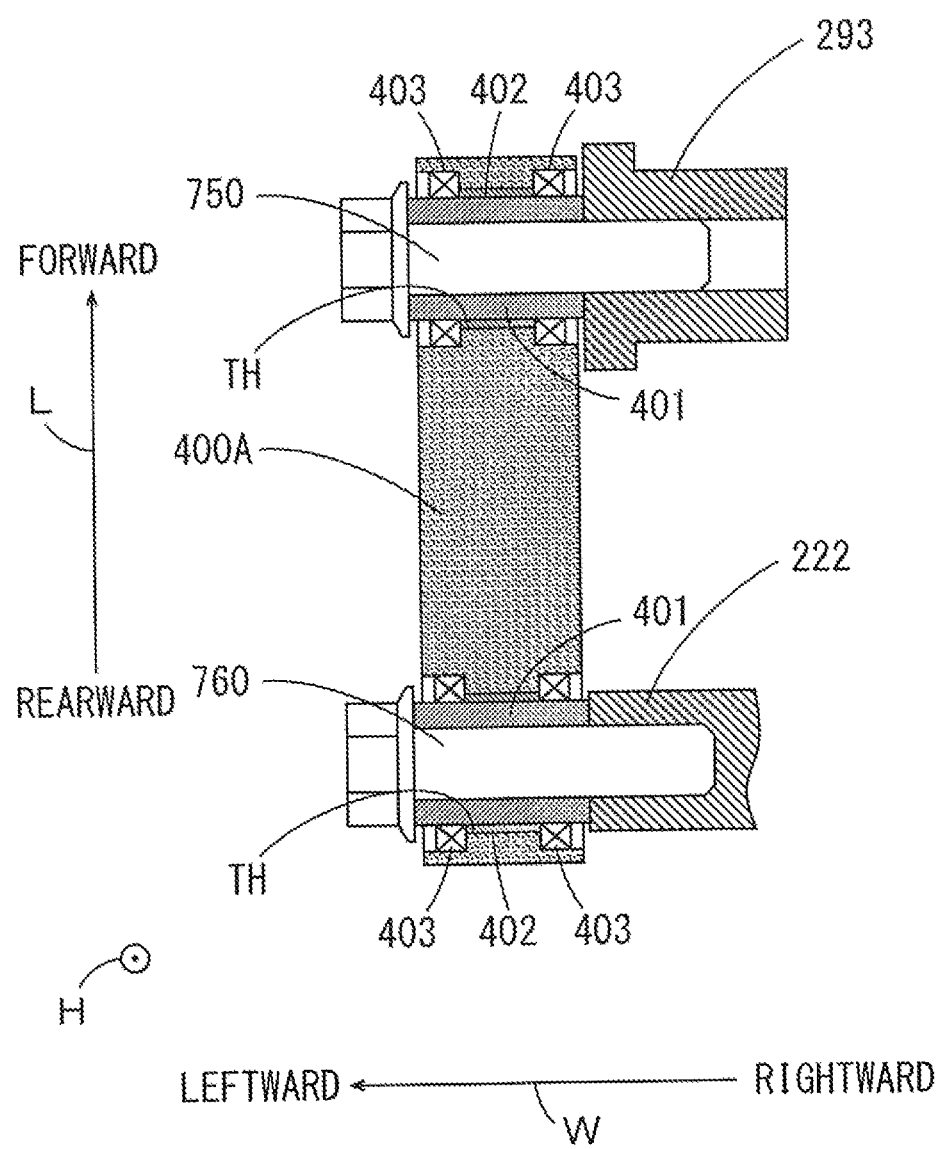
FIG. 14 is a cross sectional view for explaining an attachment structure of a left yawing restricting member in more detail.

FIG. 14 is a cross sectional view for explaining the attachment structure of the left yawing restricting member 400A in more details. As shown in FIG. 14, bolts are used as the connecting shafts 750, 760 in the present embodiment. Through holes TH are formed in both ends of the yawing restricting member 400A. The connecting shaft 750 is inserted into the through hole TH formed in one end of the yawing restricting member 400A via a collar member 401 and an oilless bush 402. The connecting shaft 760 is inserted into the through hole TH formed in the other end of the yawing restricting member 400A via a collar member 401 and an oilless bush 402. Seal members 403 are provided at both ends of each oilless bush 402. Thus, both ends of the yawing restricting members 400A respectively and smoothly swing about the connecting shafts 750, 760.

The attachment structure of the right yawing restricting member 400B is the same as the above-mentioned attachment structure of the left yawing restricting member 400A. Therefore, the both ends of the yawing restricting member 400B respectively and smoothly swing about the connecting shafts 770, 780.

(8) Attachment Structure of Rolling Restricting Member 500

Figure 15:
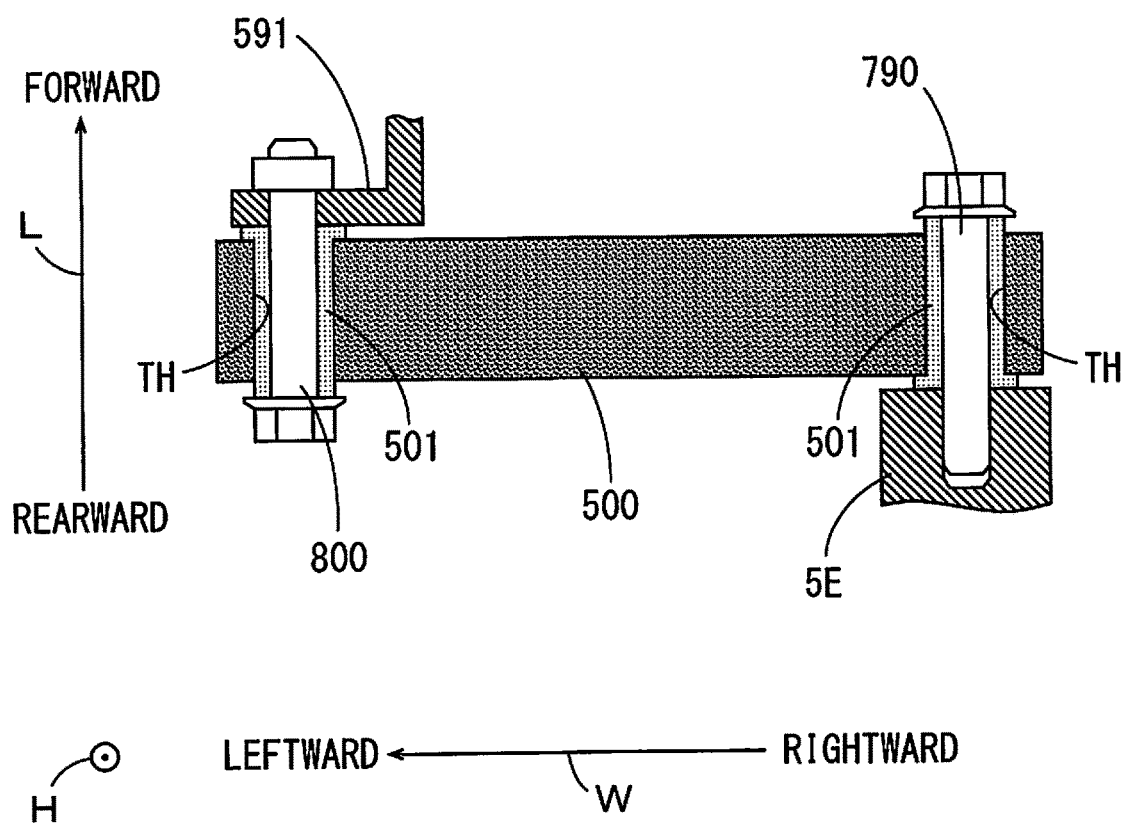
FIG. 15 is a cross sectional view for explaining an attachment structure of a rolling restricting member in more detail.

FIG. 15 is a cross sectional view for explaining the attachment structure of the rolling restricting member 500 in more details. As shown in FIG. 15, bolts are used as the connecting shafts 790, 800 in the present embodiment. Through holes TH are formed in both ends of the rolling restricting member 500. The connecting shaft 790 is inserted into the through hole TH formed in one end of the rolling restricting member 500 via a rubber damper 501. The connecting shaft 800 is inserted into the through hole TH formed in the other end of the rolling restricting member 500 via a rubber bumper 501. Thus, part of vibration generated in the engine 5 is absorbed by each rubber damper 501.

(9) Other Embodiments (a) While the engine 5 is supported at the body frame 3 by the pair of vibration absorbing support members 90A and the pair of vibration absorbing support members 90B in the above-mentioned embodiment, the engine 5 may be supported at the body frame 3 by the larger number of vibration absorbing support members. For example, when the front end portion of the engine 5 is supported at the body frame 3 by the pair of vibration absorbing support members 90A, and the rear end portion of the engine 5 is supported at the body frame 3 by the pair of vibration absorbing support members 90B, a center portion of the engine 5 may be supported at the body frame 3 by a new pair of vibration absorbing support members.

(b) While the number of projections 95 (the number of recesses 96) of the rubber member 94 provided in each of the vibration absorbing support members 90A, 90B is four in the above-mentioned embodiment, the present invention is not limited to this. The number of projections 95 (the number of recesses 96) of the rubber member 94 may be three, five, six or more. In this case, the number of extension contraction amount restricting members 93 provided in each of the vibration absorbing support members 90A, 90B is preferably the same as the number of projections 95.

(c) While the rolling restricting member 500 connects the rolling supported portion 5E in the front portion of the engine 5 to the left down tube 31 in the above-mentioned embodiment, the present invention is not limited to this. The rolling restricting member 500 may connect the rolling supported portion 5E to the right down tube 31. Further, the rolling restricting member 500 may connect any portion in the rear portion of the engine 5 to any one of the pair of vertical members 33.

(d) While the above-mentioned embodiment is an example in which the present invention is applied to a cruiser-type motorcycle, the present invention is not limited to this. The present invention may be applied to another vehicle such as a scooter-type motorcycle, a racing-type motorcycle, a four-wheeled automobile, a motor tricycle or an ATV (All Terrain Vehicle).

(10) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the motorcycle 100 is an example of a straddled vehicle, the rear wheel RW is an example of a drive wheel, the rear shock absorber 7 is an example of a single rear shock absorber, the plurality of projections 95 are examples of a first portion and a plurality of projections, the plurality of recesses 96 are examples of a second portion and a plurality of recesses, the engine support shafts 291, 292 are examples of a shaft member, the vibration absorbing support members 90A, 90B are examples of a first vibration absorbing support member and the vibration absorbing support member 90A is an example of a second vibration absorbing support member.

Further, the pitching restricting member 300A is an example of a first pitching restricting member, the pitching restricting member 300B is an example of a second pitching restricting member, the connecting shaft 710 is an example of a first shaft, the connecting shaft 720 is an example of a second shaft, the connecting shaft 730 is an example of a third shaft and the connecting shaft 740 is an example of a fourth shaft.

Further, the yawing restricting member 400A is an example of a first yawing restricting member, the yawing restricting member 400B is an example of a second yawing restricting member, the connecting shaft 750 is an example of a fifth shaft, the connecting shaft 760 is an example of a sixth shaft, the connecting shaft 770 is an example of a seventh shaft, the connecting shaft 780 is an example of an eighth shaft, the connecting shaft 790 is an example of a ninth shaft and the connecting shaft 800 is an example of a tenth shaft.

As each of constituent elements recited in the claims, various other elements having configurations or functions described in the claims can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A straddled vehicle comprising:
a body frame;
a plurality of vibration absorbing support members that support an engine at the body frame;
a drive wheel rotated by the engine;
a swing arm that extends rearwardly from the engine in a vehicle front-and-rear direction and rotatably supports the drive wheel at a position further rearward than the engine in the vehicle front-and-rear direction;
a pair of side cases arranged leftwardly and rightwardly of the swing arm in a plan view of the vehicle;
a single rear shock absorber that supports the swing arm at the body frame;
a pitching restricting member that connects the engine to the body frame such that vibration of the engine in a top-and-bottom direction with respect to the body frame is allowed, and connects the engine to the body frame such that pitching of the engine with respect to the body frame is restricted;
a yawing restricting member that connects the engine to the body frame such that vibration of the engine in the top-and-bottom direction with respect to the body frame is allowed, and connects the engine to the body frame such that yawing of the engine with respect to the body frame is restricted; and
a rolling restricting member that connects the engine to the body frame such that vibration of the engine in the top-and-bottom direction with respect to the body frame is allowed, and connects the engine to the body frame such that rolling of the engine with respect to the body frame is restricted,
wherein
in the plan view of the vehicle, the rear shock absorber is arranged between the engine and the drive wheel and between a right end and a left end of the swing arm,
the swing arm is rigidly and pivotally connected to the engine,
each of the plurality of vibration absorbing support members includes an outer cylinder, an inner cylinder arranged in the outer cylinder and a rubber member provided between the outer cylinder and the inner cylinder,
the engine is attached to the inner cylinder, and the body frame is attached to the outer cylinder,
the rubber member has a first portion being in contact with an inner surface of the outer cylinder, and a second portion not being in contact with the inner surface of the outer cylinder, and
a maximum thickness of the rubber member in a radial direction of the outer cylinder and the inner cylinder is equal to or larger than ½ of an inner diameter of the inner cylinder.

2. The straddled vehicle according to claim 1, wherein the first portion of the rubber member includes a plurality of projections that project from the inner cylinder towards the outer cylinder, the second portion includes a plurality of recesses, and each one of the plurality of recesses is arranged between two adjacent projections of the plurality of projections.

3. The straddled vehicle according to claim 2, wherein each of the plurality of vibration absorbing support members includes a plurality of extension contraction amount restricting members provided at the plurality of recesses of the rubber member, and the plurality of extension contraction amount restricting members restrict an amount of extension and contraction of the rubber member within a constant range.

4. The straddled vehicle according to claim 1, further comprising a shaft member that extends in a vehicle width direction, wherein
the plurality of vibration absorbing support members include a first vibration absorbing support member, and
the shaft member is inserted into the inner cylinder of the first vibration absorbing support member, and the engine and the swing arm are attached to the shaft member.

5. The straddled vehicle according to claim 4, wherein the plurality of vibration absorbing support members include a second vibration absorbing support member that supports the engine at the body frame at a position further forward than the first vibration absorbing support member in the vehicle front-and-rear direction.

6. The straddled vehicle according to claim 5, wherein a maximum thickness of the rubber member in a radial direction of the outer cylinder and the inner cylinder of the second vibration absorbing support member is equal to or larger than an inner diameter of the inner cylinder.

7. The straddled vehicle according to claim 1, wherein the pitching restricting member includes first and second pitching restricting members that extend in the vehicle front-and-rear direction in the plan view of the vehicle and are arranged at upper and lower positions,
the first pitching restricting member is attached to the engine to be swingable about a first shaft in parallel with a vehicle width direction, and is attached to the body frame to be swingable about a second shaft in parallel with the vehicle width direction, and
the second pitching restricting member is attached to the engine to be swingable about a third shaft in parallel with the vehicle width direction, and is attached to the body frame to be swingable about a fourth shaft in parallel with the vehicle width direction.

8. The straddled vehicle according to claim 1, wherein the yawing restricting member includes first and second yawing restricting members that extend in the vehicle front-and-rear direction and are respectively arranged leftwardly and rightwardly of the body frame in the plan view of the vehicle,
the first yawing restricting member is attached to the engine to be swingable about a fifth shaft in parallel with a vehicle width direction, and is attached to the body frame to be swingable about a sixth shaft in parallel with the vehicle width direction, and
the second yawing restricting member is attached to the engine to be swingable about a seventh shaft in parallel with the vehicle width direction, and is attached to the body frame to be swingable about an eighth shaft in parallel with the vehicle width direction.

9. The straddled vehicle according to claim 1, wherein the rolling restricting member, in the plan view of the vehicle, is arranged to extend in a vehicle width direction, is attached to the engine to be rotatable about a ninth shaft in parallel with the vehicle front-and-rear direction, and is attached to the body frame to be rotatable about a tenth shaft in parallel with the vehicle front-and-rear direction.

10. The straddled vehicle according to claim 1, wherein the rolling restricting member is arranged at a position further forward than the pitching restricting member and the yawing restricting member in the vehicle front-and-rear direction.

* * * * *